(12) United States Patent
Sato et al.

(10) Patent No.: US 7,885,920 B2
(45) Date of Patent: Feb. 8, 2011

(54) SYSTEM FOR MANAGING THE PROPERTY OF RESEARCH AND DEVELOPMENT

(75) Inventors: Keiichi Sato, Tokyo (JP); Junji Yoshii, Tokyo (JP); Mami Furukubo, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 809 days.

(21) Appl. No.: 11/902,484

(22) Filed: Sep. 21, 2007

(65) Prior Publication Data

US 2008/0288455 A1 Nov. 20, 2008

(30) Foreign Application Priority Data

Sep. 26, 2006 (JP) ............... 2006-260794

(51) Int. Cl.
*G06F 7/00* (2006.01)
(52) U.S. Cl. ..................... 707/609
(58) Field of Classification Search .......... 707/609
See application file for complete search history.

(56) References Cited

U.S. PATENT DOCUMENTS

| | | | |
|---|---|---|---|
| 6,499,054 B1 | 12/2002 | Hesselink et al. | |
| 2002/0133495 A1* | 9/2002 | Rienhoff et al. | 707/100 |
| 2003/0036815 A1 | 2/2003 | Krishnamurthy et al. | |
| 2003/0144868 A1* | 7/2003 | MacIntyre et al. | 705/1 |
| 2004/0260714 A1* | 12/2004 | Chatterjee et al. | 707/101 |
| 2005/0043894 A1* | 2/2005 | Fernandez | 702/19 |
| 2005/0055347 A9* | 3/2005 | Cho et al. | 707/5 |

FOREIGN PATENT DOCUMENTS

| | | |
|---|---|---|
| EP | 1 244 024 A2 | 4/1996 |
| EP | 1 074 925 A2 | 8/2000 |

OTHER PUBLICATIONS

European Patent Office Extended European Search Report for 07018614.3-2221, dated Feb. 18, 2008.

* cited by examiner

*Primary Examiner*—Charles Rones
*Assistant Examiner*—Fazlul Quader
(74) *Attorney, Agent, or Firm*—Stites & Harbison, PLLC; Juan Carlos A. Marquez, Esq.

(57) ABSTRACT

Computerization of experiment notebooks that satisfy requirements for experiment records and effective utilization of computerized experiment notebooks and experiment data are facilitated. A computer used by the experimenter comprises: a first means for displaying an experiment notebook form on the screen of a display unit and receiving description data for individual description items on the screen via input means; a second means for checking whether or not required description items are all filled with description data and storing such data; a third means for transmitting the experiment notebook data and experiment data to a management computer; a fourth means for allowing the management computer to integrally edit (by pasting) the experiment data with respect to the experiment notebook data, converting into experiment notebook data of a file format (PDF) for which only reference is allowed, and storing in an experiment notebook database; and a fifth means for storing the experiment data in an experiment data-database with the addition of link information associated with the experiment notebook data.

9 Claims, 41 Drawing Sheets

FIG. 4

USER INFORMATION DB     13

| USER ID | PASSWORD | APPROVAL AUTHORITY | USER NAME |
|---|---|---|---|
| LS123 | k0001 | PRESENT | PROF. SATO |
| LS456 | wskl3 | PRESENT | ASS. PROF. TANAKA |
| LS456 | ert12 | ABSENT | ASS. PROF. TANAKA |
| LS987 | zxc45 | ABSENT | RESEARCHER SUZUKI |
| LS023 | +tyujk | ABSENT | RESEARCHER MORI |

EXPERIMENT NOTEBOOK CREATION SCREEN

| EXPERIMENT NOTEBOOK CONTENT | ☑ NEW | ☑ EXPERIMENT NOTEBOOK AND EXPERIMENT DATA |
| --- | --- | --- |
| | ☐ CORRECT | ☐ EXPERIMENT NOTEBOOK, EXPERIMENT DATA, AND IDEAS |
| | ☐ ADD | ☐ IDEAS ALONE |

1. PROJECT NAME (PJ)

2. EXPERIMENT TITLE (*)

3. DATE OF EXPERIMENT (*)

4. EXPERIMENTER/CO-EXPERIMENTER (*)

5. PURPOSE OF EXPERIMENT (*)

6. PRINCIPLE/METHOD OF EXPERIMENT (*)　　　　(*) REQUIRED ITEMS

7. APPARATUS USED IN EXPERIMENT (*)

8. ANALYSIS OF EXPERIMENT (*)

9. REFERENCE MATERIAL

10. IDEAS

B12 STORE　　B13 RETURN

EXPERIMENT NOTEBOOK SUBMISSION SCREEN

W01

HISTORY

〈UNAPPROVED〉
2005/12/02
〈REJECTED〉
2005/12/01
〈APPROVED〉
2005/11/30

[CORRECT] [WITHDRAW] [ADD]
504   504   504

W02

<REGISTRATION DATA>

EXPERIMENT NOTEBOOK FILE

EXPERIMENT DATA FILE

SUBMITTED TO:

<PROF. SATO>
<ASS. PROF. TANAKA>
<PROF. NAKAMURA>

[CLEAR]   [SUBMIT]
B15       B14

[RETURN]
B13

FIG. 16

EXPERIMENT NOTEBOOK SUBMISSION SCREEN — G04

HISTORY — W01

- ⟨UNAPPROVED⟩ 2005/12/02
- ⟨REJECTED⟩ 2005/12/01
- ⟨APPROVED⟩ 2005/11/30

[CORRECT] B01  [WITHDRAW] B02  [ADD] B03

EXPERIMENT NOTEBOOK FILE
- EXPERIMENT NOTEBOOK.jik

EXPERIMENT DATA FILE
- PHOTO.pho
- GRAPH.gla

SUBMITTED TO:
- ⟨PROJECT X MANAGER⟩
- ⟨PROJECT Y MANAGER⟩
- ⟨PROJECT Z MANAGER⟩

[CLEAR] B15    [SUBMIT] B14

1601 — REQUIRED ITEM DESCRIPTION ERROR
DATE OF EXPERIMENT IS NOT ENTERED.
PLEASE RETURN TO CREATION SCREEN AND RE-ENTER.

[RETURN] B13

FIG. 18

BROWSE RESULT SCREEN　　　　　　　　　USER: MORI, RESEARCHER

G08

| YEAR | 2006 | PJ | △PJ | ▽ | EXPERIMENTER | ▽ | PAGE | | REFER | B16 |

SUMMARY INFORMATION
PROJECT: ○○PJ
DATE: 2006/05/30
EXPERIMENTER: ○○　△△

EXPERIMENT
DATA LINK INFORMATION
exp10001

COMMENT
2005/6/24　PROF.○×
2005/7/14　○○○○

UPDATE HISTORY
2005/05/23 SUBMITTED
2005/05/24 CORRECTIVE SUBMISSION
2005/07/01 ADDITIONAL SUBMISSION

BROWSE — B05

RETURN — B13

FIG. 20

SEARCH RESULT DISPLAY SCREEN    USER: MORI, RESEARCHER

DATE  2005/1/1  ~  2006/12/31

PJ  ▷

EXPERIMENTER  ▷                                    PAGE           B16 — REFER

SEARCH RESULT

| DATE | PJ | EXPERIMENTER | PAGE |
|---|---|---|---|
| 2002/10/4 | ○○PJ | ○○ ×× | 125 |
| 2003/9/3 | △△PJ | △△ ◇◇ | 223 |
| 2003/11/22 | □□PJ | △△ ○○ | 451 |
| 2004/5/15 | ◇◇PJ | ○△ ◇◇ | 113 |
| 2004/8/21 | △△PJ | □□ ○○ | 580 |
| 2005/2/9 | ○○PJ | ○△ □□ | 1125 |
| 2006/1/25 | ◇◇PJ | △□ ○○ | 600 |

B06 — SEARCH

B13 — RETURN

FIG. 22

UNAPPROVED CASES DISPLAY  USER: PROF. SATO

COMMENT  2201

LIST OF UNAPPROVED CASES

2005/12/3 ○○○
2005/12/2 △△△△

EXPERIMENT NOTEBOOK

BROWSE (B05) B06  SEARCH (B08)  APPROVE

DETAILED DISPLAY (B09)
DECIDE REJECTION (B11)
DECIDE APPROVAL (B10)

RETURN (B13)

EXPERIMENT NOTEBOOK DB 5

EXPERIMENT NOTEBOOK DATA

| NOTEBOOK ID | EXPERIMENT NOTEBOOK FILE | TIME STAMP | TYPE OF SUBMISSION | APPROVED BY | STATUS | UPDATE HISTORY (RELATED SOURCE) | COMMENT ID |
|---|---|---|---|---|---|---|---|
| nt10001 | 01.pdf | 2005/05/23 17:15 | NEW SUBMISSION | SATO | | | |
| nt10002 | 02.pdf | 2005/05/23 | NEW SUBMISSION | SATO | | | cm10001 |
| nt10003 | 03.pdf | 2005/05/24 | CORRECTIVE SUBMISSION | SATO | CORRECTION APPROVED | nt10001 | cm10002 |
| nt10004 | 04.pdf | 2005/05/24 | ADDITIONAL SUBMISSION | SATO | ADDITION APPROVED | nt10001 nt10003 | |
| nt10009 | 09.pdf | 2005/05/30 | NEW SUBMISSION | SATO | | | |
| nt10009 | 09.pdf | 2005/05/31 | WITHDRAW | SATO | WITHDRAWN | | |

COMMENT DATA

| COMMENT ID | COMMENT DATA FILE | TIME STAMP | | |
|---|---|---|---|---|
| cm10001 | 010001.com | 2005/05/25 | | |
| cm10002 | 010002.com | 2005/05/25 | | |
| | | | | |
| | | | | |

FIG. 32

EXPERIMENT DATA DB

EXPERIMENT DATA

| EXPERIMENT DATA ID | EXPERIMENT DATA FILE | TIME STAMP | TYPE | APPROVED BY | STATUS | UPDATE HISTORY (RELATED SOURCE) | NOTEBOOK ID |
|---|---|---|---|---|---|---|---|
| exp10001 | [01.gia] [01.pho] | 2005/05/23 17:15 | NEW SUBMISSION | SATO | | | nt10001 |
| exp10002 | [02.gia] [02.pho] | 2005/05/23 | NEW SUBMISSION | SATO | | | nt10002 |
| exp10003 | [03.gia] [03.pho] | 2005/05/24 | CORRECTIVE SUBMISSION | SATO | CORRECTION APPROVED | exp10001 | nt10003 |
| exp10004 | [04.gia] [04.pho] | 2005/05/24 | ADDITIONAL SUBMISSION | SATO | ADDITION APPROVED | exp10001 exp10003 | nt10004 |
| exp10009 | [09.gia] [09.pho] | 2005/05/30 | NEW SUBMISSION | SATO | WITHDRAWN | | Nt10009 |
| exp10009 | [09.gia] [09.pho] | 2005/05/31 | WITHDRAW | SATO | | | nt10009 |

FIG. 33

HISTORY MANAGEMENT DB

HISTORY MANAGEMENT DATA

| HISTORY ID | NOTEBOOK ID | TIME STAMP | TYPE OF SUBMISSION | CARRY OUT BY | STATUS | PJ NAME | EXPERIMENTER | START PAGE | END PAGE |
|---|---|---|---|---|---|---|---|---|---|
| 00001 | nt10001 | 2005/05/23 17:55 | NEW SUBMISSION | MORI | APPROVED | A01 | MORI | 1 | 5 |
| 00002 | nt10002 | 2005/05/23 18:02 | NEW SUBMISSION | SUZUKI | | B01 | SUZUKI | 1 | 7 |
| 00003 | nt10003 | 2005/05/24 09:05 | CORRECTIVE SUBMISSION | MORI | CORRECTION APPROVED | A01 | MORI | 1 | 6 |
| 00004 | nt10004 | 2005/05/24 10:15 | ADDITIONAL SUBMISSION | MORI | ADDITION APPROVED | A01 | MORI | 1 | 3 |
| 00005 | nt10001 | 2005/05/30 12:01 | APPROVED | SATO | | A01 | TANAKA | 1 | 5 |
| 00010 | nt10003 | 2005/05/31 11:00 | CORRECTION APPROVED | SATO | | A01 | TANAKA | 1 | 6 |
| 00011 | nt10004 | 2005/05/31 12:20 | ADDITION APPROVED | SATO | | A01 | TANAKA | 1 | 6 |

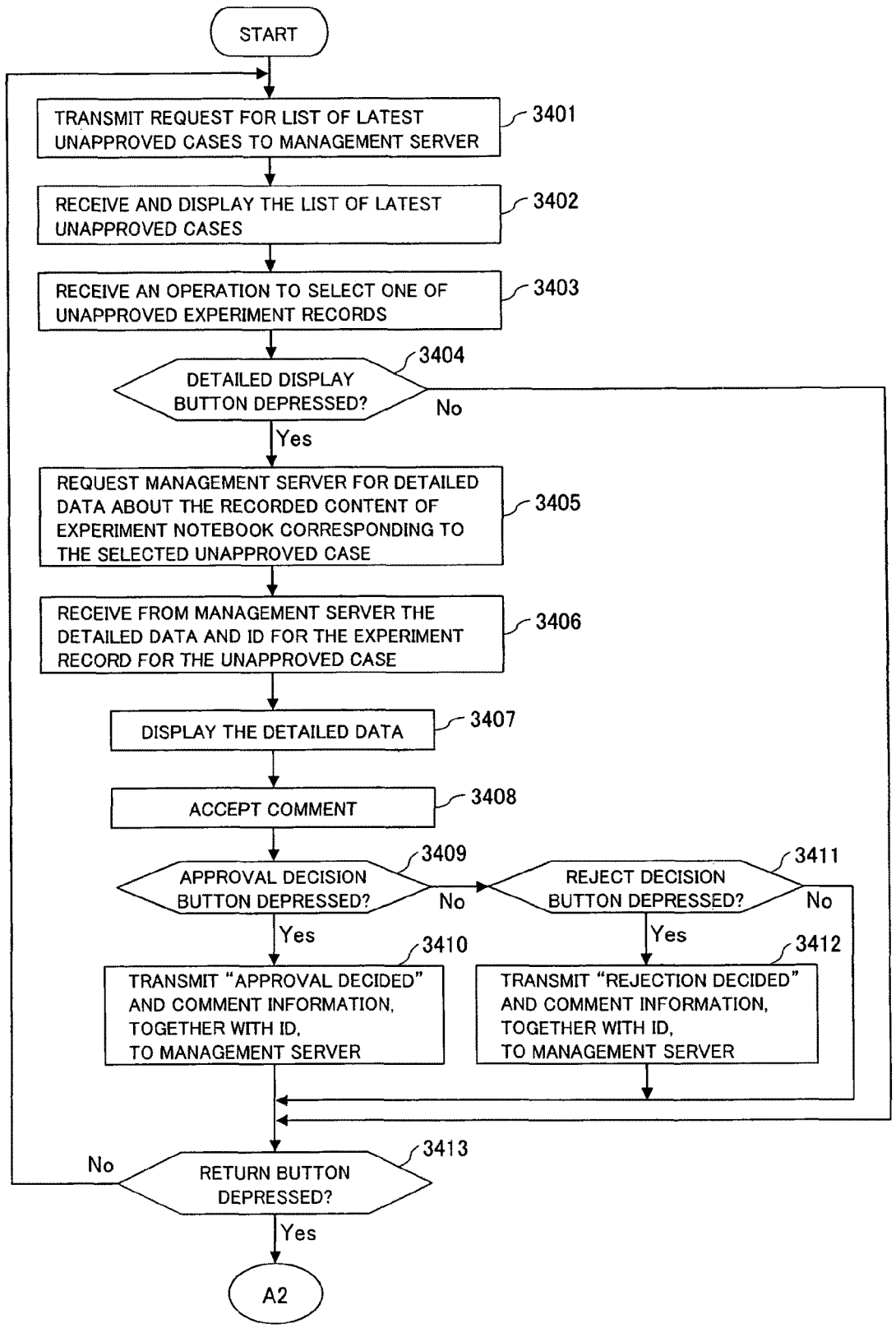
FIG. 34  EXPERIMENT RECORD APPROVAL PROGRAM

FIG. 38  EXPERIMENT RECORD BROWSE PROGRAM

EXPERIMENT NOTEBOOK CREATION SCREEN

EXPERIMENT NOTEBOOK CONTENT
- ☑ NEW
- ☐ CORRECTION
- ☐ ADDITION
- ☑ EXPERIMENT NOTEBOOK AND EXPERIMENT DATA
- ☐ EXPERIMENT NOTEBOOK, EXPERIMENT DATA, AND IDEAS
- ☐ IDEAS ALONE

REQUIRED DESCRIPTION ITEMS — 401

- EXPERIMENT TITLE (SUBJECT NAME)
- DATE OF EXPERIMENT
- EXPERIMENTER/ CO-EXPERIMENTER
- PURPOSE OF EXPERIMENT
- PRINCIPLE AND METHOD OF EXPERIMENT
- APPARATUS USED IN EXPERIMENT
- ANALYSIS OF EXPERIMENT
- PROJECT NAME

OPTIONAL DESCRIPTION ITEMS — 402

- REFERENCE MATERIAL
- IDEAS

— 403

EDIT SCREEN

B12 STORE   B13 RETURN

FIG. 41

EXPERIMENT NOTEBOOK CREATION SCREEN — G03

EXPERIMENT NOTEBOOK CONTENT
- ☑ NEW
- ☐ CORRECTION
- ☐ ADDITION
- ☑ EXPERIMENT NOTEBOOK AND EXPERIMENT DATA
- ☐ EXPERIMENT NOTEBOOK, EXPERIMENT DATA, AND IDEAS
- ☐ IDEAS ALONE

REQUIRED DESCRIPTION ITEMS — 401

- DATE OF EXPERIMENT
- EXPERIMENTER/CO-EXPERIMENTER
- PRINCIPLE AND METHOD OF EXPERIMENT
- APPARATUS USED IN EXPERIMENT
- PROJECT NAME

AFFIX STAMP

OPTIONAL DESCRIPTION ITEMS — 402

- REFERENCE MATERIAL
- IDEAS

EDIT SCREEN — 403

PURPOSE OF EXPERIMENT

PURPOSE OF THIS EXPERIMENT IS TO FIND A SIMPLE METHOD OF ANALYZING GENE MUTATION

EXPERIMENT TITLE (SUBJECT NAME)

GENE MUTATION ANALYSIS METHOD

ANALYSIS OF EXPERIMENT

ANALYSIS
THIS METHOD HAS POOR ACCURACY AND IS NOT PRACTICAL

B12 STORE    B13 RETURN

SYSTEM FOR MANAGING THE PROPERTY OF RESEARCH AND DEVELOPMENT

BACKGROUND OF THE INVENTION

1. Field of the Invention

The present invention relates to a system for managing the property of research and development in which experiment notebooks, property relating to research and development for various products, are computerized, and experiment data and ideas relating to items described in experiment notebooks are efficiently used and managed.

2. Background Art

Regarding the experiment apparatus used for research and development for various products, those capable of obtaining measurement or imaging results in the form of electronic data account for the greatest percentage, and such data is electronically stored in personal computers or the like separately. However, experiment notebooks, or experiment records are still written by hand, and the computerization thereof has not made much progress in the present circumstances. Namely, a troublesome, old-style way requiring, for example, a task of pasting hardcopies of experiment data in experiment notebooks is still mainly used, and therefore, it cannot be said that the merit of the computerization of data is sufficiently enjoyed under the present circumstances where report writing, research-paper writing, or patent-application filing is done with electronic data.

Generally, the experiment notebooks, or experiment records need to be created so that the following requirements are satisfied:

Note that, for convenience sake, the requirements are classified roughly into two, description requirements and operation requirements.

(a) Description Requirements:
a1. Such information as comprehensible to a third person must be sufficiently described;
a2. All that is necessary for experiments must be specified (primary data is the most important);

The primary data refers to raw data obtained by measurement apparatus.

a3. All processes after secondary data must be entered;

The secondary data refers to data that is obtained by adding some process to the primary data.

a4. Upon completion of experiment, conclusions for the results of the experiment must be presented and an evaluation of the conclusions must be made;
a5. A title and a motive/objective comprehensible to anybody must be entered;
a6. The normal names of abbreviations/brevity codes must be described in advance in context, so that they are comprehensible;
a7. References must be entered; and
a8. Description must be made so that the scope of an experiment is clearly specified.

(b) Operation Requirements:
b1. The back of each of the notebooks to be used must be sewed, and the notebooks must be numbered according to date, with earliest dates first;
b2. Pens using indelible ink, such as ballpoint pens, must be used;

In cases in which any content of the notebooks need to be corrected or anything needs to be added thereto, the date and the name of the person who has made the correction or addition must be entered.

b3. The fact that the notebooks cannot be falsified or has not been falsified must be verified;
b4. The notebooks must be strictly managed as quasi-official documents;
b5. Ideas, anything that comes to the attention, or the like also need to be entered as clearly as possible, along with the dates of the process of conception, implementation, completion, or the like; and
b6. One's own signature and that of a third person are required for confirmation.

These requirements need to be satisfied for computerization, resulting in a cause for preventing the computerization of experiment notebooks.

In the United States, as a regulation relating to electronic records and electronic signatures, there is Part 11 of Title 21 of the Code of Federal Regulations. This was established as a regulation for assuring that electronic records and electronic signatures are legally equally reliable as a substitute for paper records and conventional handwritten signatures and are thus equivalent thereto. Regarding the electronic records or electronic signature systems in conformity with the above Part 11, various products have been developed by various companies. However, no products are found relating to systems in which the experiment notebooks satisfying the above description requirements and operation requirements are computerized.

Conventionally, there are Patent Documents 1 and 2 below as conventional techniques directed to experiment data:

Patent Document 1: JP Patent Publication (Kohyo) No. 2003-517229 A
Patent Document 2: JP Patent Publication (Kohyo) No. 2005-520225 A The invention disclosed in Patent Document 1 relates to a method and system for enabling multiple users from physically-different locations to access, observe, control, and manipulate physical processes and devices via a network.

The invention disclosed in Patent Document 2 relates to an experiment management system and method for automating experiments within an automated environment without the need to isolate the test subject from that environment.

SUMMARY OF THE INVENTION

However, the above Patent Document 1 or 2 does not disclose computerizing the experiment notebooks satisfying the above description requirements and operation requirements.

Experiment data includes data that is outputted from experiment apparatus or the like, and data that is created/processed by an experimenter him/herself. When such experiment data exists by itself, it is often very difficult for those other than the experimenter who have not received the detailed explanation of the data, to speculate about the meaning.

Further, along with the above computerization of experiment data, the experiment data themselves is often stored in personal computers. There are cases in which the data is used for writing a research paper, a report, or the like by the experimenter on his/her own; however, often times, the experimenter creates a file name arbitrarily, and the data is individually managed in separate manners. Thus, when other researchers involved in the same research/development need to refer to experiment data obtained by one experimenter through experiments and to find new research/development challenges, the experiment data obtained by the experimenter through experiments cannot easily be referred to. Furthermore, even if such data could be referred to, since explanations or processes about the experiment data are not recorded in the experiment data, the meaning or the value of the experiment data itself cannot be recognized. Thus, such conventional methods pose an impediment in terms of devising new research/development challenges or ideas or conducting research-paper writing or the like by effectively using the experiment data that many researchers and developers have, thereby causing a problem that effective utilization of research/development property makes little progress.

It is an object of the present invention to provide a system for managing the property of research and development in which experiment notebooks satisfying the requirements required for experiment records can be easily computerized and effective utilization of the computerized experiment notebooks or experiment data can be facilitated.

In order to achieve the above object, the invention provides a system for managing the property of research and development according to the present invention, comprising:

a computer individually used by each experimenter and experiment approver; and a management computer for managing an experiment notebook database, an experiment data database, and a history management database, wherein the computer used by each experimenter comprises:

first means for displaying an experiment notebook form in which predetermined description items are described and description fields are left in blank on a screen of a display unit and receiving description data with respect to the individual description items on the screen from an input means;

second means for checking, when an operation indicating the completion of description data entry is performed, whether all the description data in the description items satisfying required description requirements has been entered and temporarily storing the data as experiment notebook data in a storage means when all the data has been entered; and third means for sending the experiment notebook data and the experiment data obtained via measurement apparatus, corresponding to the experiment notebook data, to the management computer via a network in accordance with a registration operation by the experimenter, and wherein the management computer comprises:

fourth means for receiving the experiment notebook data and the experiment data from the experimenter's computer, integrally editing (paste-editing) the experiment data with the experiment notebook data, converting the data into experiment notebook data in a file format (e.g., Portable Document Format, hereafter referred to as PDF) to which access is allowed for reference purposes only, providing the data with a time stamp, and then storing the data in the experiment notebook database;

fifth means for providing the experiment data received together with the experiment notebook data with link information to the experiment notebook data and storing the experiment data in the experiment data database; and sixth means for recording history information such as type information indicating whether the experiment notebook data and experiment data stored in the experiment notebook database and the experiment data database is newly submitted, submitted after correction, or submitted after addition, and registrants, in the history management database.

The computer used by each experimenter further comprises seventh means for: sending user authentication information of the experimenter using the computer to the management computer for receiving user authentication; receiving, upon successful user authentication, the history information including the submission history of the experiment notebook data of the experimenter and the approval history by the approver from the management computer; and displaying the information on the display screen.

The management computer further comprises eighth means for: receiving user authentication information from the computer used by the experimenter, identifying whether the experimenter is registered in a user information database, and sending back, when the experimenter is identified to be registered, the history information including both submission history concerning the experiment notebook data and the experiment data submitted by the experimenter and approval history by the approver, to the computer used by the experimenter.

The computer used by the approver further comprises ninth means for: sending user authentication information of the approver using the computer to the management computer for receiving user authentication; receiving, upon successful user authentication, a list of experiment notebook data not approved by the approver from the management computer; and displaying the list on the display screen.

The management computer further comprises tenth means for receiving user authentication information from the computer used by the approver, identifying whether the approver is registered in a user information database, and sending, when the approver is determined to be registered, searching the history management data base for the experiment notebook data not approved by the approver, and sending back a list of unapproved experiment notebook data, to the computer used by the approver.

The computer used by each experimenter and approver further comprises eleventh means for: receiving a search condition with respect to the experiment notebook data, experiment data, and history information from an input means; sending the search request based on the search condition to the management computer; and displaying the search result received from the management computer on the display screen.

The management computer further comprises twelfth means for searching the experiment notebook database, the experiment data database, and history management database for the experiment notebook data and the experiment data corresponding to the search request and sending back the retrieved experiment notebook data, experiment data, and list of history information to the computer from which the search request has been sent.

The computer used by each experimenter and approver further comprises thirteenth means for: receiving a request for a search for any one of the experiment notebook data, experiment data, and history information in the search result list displayed on the display screen from the input means; sending the search request to the management computer; and displaying the experiment notebook data, experiment data, and history information corresponding to the search request received from the management computer on the display screen.

The management computer further comprises fourteenth means for: searching the experiment notebook database, experiment-data database, and history management database for the experiment notebook data, experiment data, and history information corresponding to the search request; and sending back the retrieved experiment notebook data, experiment data, and history information to the computer from which the search request has been sent.

The computer used by each experimenter and approver further comprises twentieth means for receiving a browse condition with respect to the experiment notebook data and experiment data from an input means; sending a browse request indicating the browse condition to the management computer; and displaying the result received from the management computer on a display screen.

The management computer further comprises fifteenth means for: searching the experiment notebook database, experiment-data database, and history management database for the experiment notebook data, experiment data, and history information corresponding to the browse request; and sending back the retrieved experiment notebook data, experiment data, and history information to the computer from which the browse request has been sent.

The computer used by the approver further comprises: sixteenth means for receiving a request for the detailed display of any one of the experiment notebook data in the list of unapproved experiment notebook data displayed on the display screen, sending a request for the acquisition of the experiment notebook data to the management computer, and displaying the experiment notebook data received from the management computer on the display screen; and seventeenth means for receiving comment data with respect to the displayed experiment notebook data from the input means, receiving a decision based on an "Approve" button or a "Reject" button and sending the entered comment data and decision information to the management computer.

The management computer further comprises: eighteenth means for searching the experiment notebook database for the experiment notebook data corresponding to the request for the acquisition of the experiment notebook data and sending the data to the computer from which the request has been sent; and nineteenth means for associating the comment data and decision information received from the computer with the corresponding experiment notebook data, storing the data in the experiment notebook database, and updating the status of the experiment notebook data in the history management database in accordance with the decision information.

The second means for the computer used by each experimenter refers to required description items previously set in a required description item table so as to check whether all the description data in the description items satisfying the required description requirements is entered.

At least one of the control number of experiment apparatus, the usage time period, and the signature of the apparatus manager is set in the required description item table.

The second means for the computer used by each experimenter receives biological information unique to the creator of experiment notebook data, adds the biological information to the experiment notebook data, and stores the experiment notebook data in the storage means.

EFFECTS OF THE INVENTION

When experiment notebook data is created, since the present invention comprises: means for checking essential description requirements; means for associating experiment notebook data with experiment data and unifying the management of the data; means for retrieving and browsing experiment notebook data and experiment data; and means for determining approval or disapproval, it is possible to easily computerize experiment notebooks satisfying the requirements necessary for experiment records and to facilitate effective utilization of computerized experiment notebooks or experiment data.

Further, as the description requirements, by checking at least one of the control number of the experiment apparatus, the usage time period of the apparatus, and the signature of the apparatus manager, the credibility of experiment data can be enhanced.

Furthermore, by integrally editing experiment notebook data and experiment data, converting the data to that in a file format to which reference thereto alone is enabled, and storing the data in a database, falsification can be prevented, thereby improving reliability.

In addition, with a browse function or search function, research products by other researchers can be referred to, enabling a contribution to the devisal of new ideas.

BRIEF DESCRIPTION OF THE DRAWINGS

FIG. 4 shows an example of user information stored in a user information DB.

FIG. 6 shows screen transitions in cases in which, for example, experiment notebook data is created with the client PC2 and experiment notebook data stored in a database of the management server is searched for.

FIG. 11 shows an example of an experiment notebook creation screen G03.

FIG. 12 shows an example of an experiment notebook submission screen G04 on which a registration data window W02 is displayed adjacent to a history window W01.

FIG. 16 shows an example in which a dialog box indicating error in regard to an omission of required description items is displayed.

FIG. 18 shows an example of a browse screen G08.

FIG. 20 shows an example of a search result display screen G06.

FIG. 22 shows an example of an unapproved case detail display screen G10.

FIG. 31 shows a structure of experiment notebook data and comment data stored in an experiment notebook DB.

FIG. 32 shows a structure of experiment data stored in an experiment data DB.

FIG. 33 shows a structure of history management data stored in a history management DB.

FIG. 34 shows a flowchart of the processing performed by an experiment record approval program in the approver PC3.

FIG. 40 shows another example of the experiment notebook creation screen for creating experiment notebooks by use of required description item stamps and optional description item stamps.

FIG. 41 shows an example in which necessary stamps are moved in an edit window 3 so as to enter necessary information.

DESCRIPTION OF THE PREFERRED EMBODIMENTS OF THE INVENTION

The present invention is described in detail hereafter with reference to the attached drawings.

Figure 1:
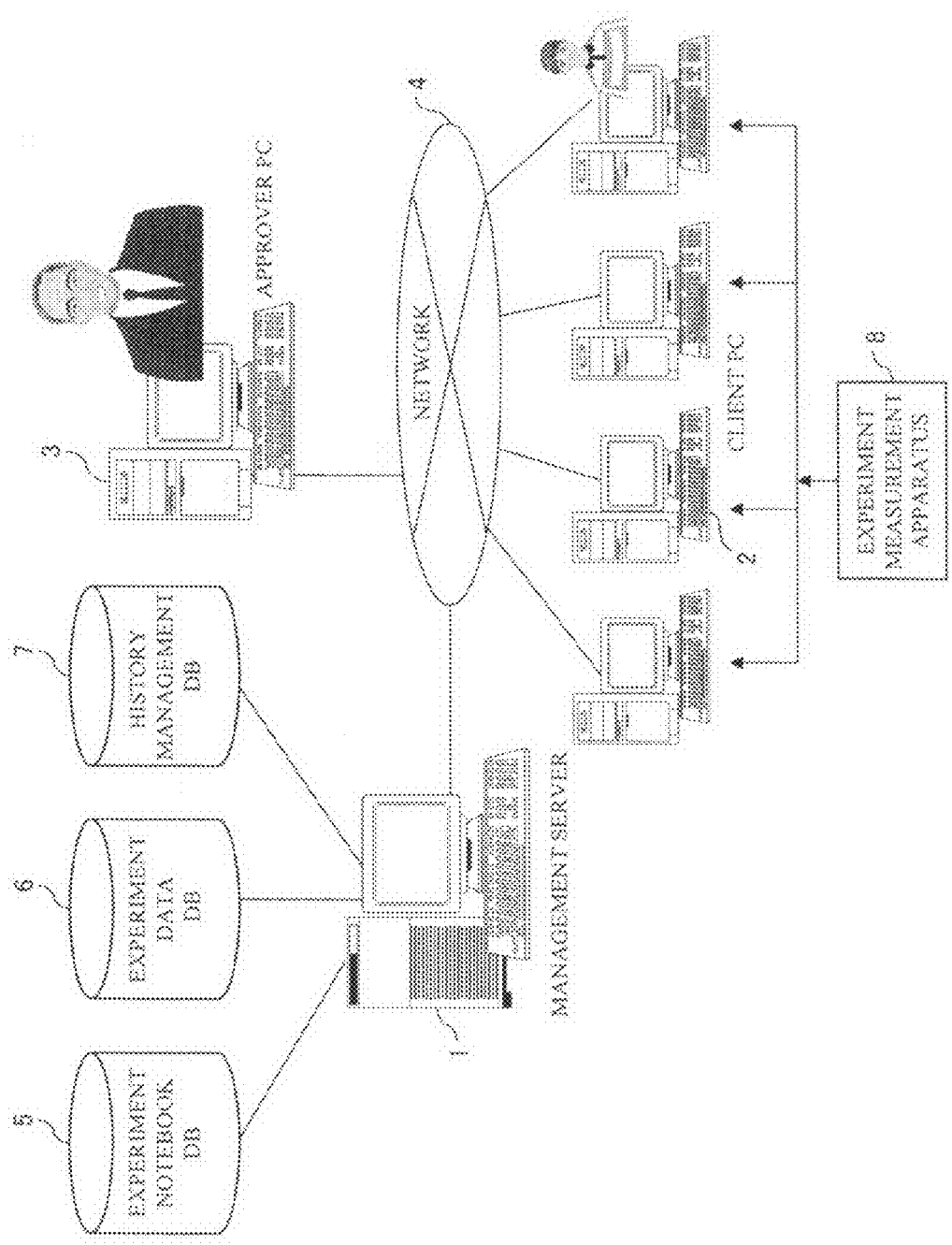
FIG. 1 shows a system configuration diagram of an embodiment of a system for managing the property of research and development according to the present invention.

FIG. 1 shows a system configuration diagram of an embodiment of a system for managing the property of research and development according to the present invention.

The system of the present embodiment comprises: a management server 1 for managing the storage, submission, and approval history of experiment notebook data or experiment data; client computers (hereafter, client PC) 2 used by individual experimenters; a computer (hereafter, approver PC) 3 used by an approver having approval authority; a network 4 connecting the above computers; an experiment notebook DB5, an experiment data DB6, and a history management DB7 managed by the management server 1; and an experiment measurement apparatus 8 used by the experimenters.

Figure 2:
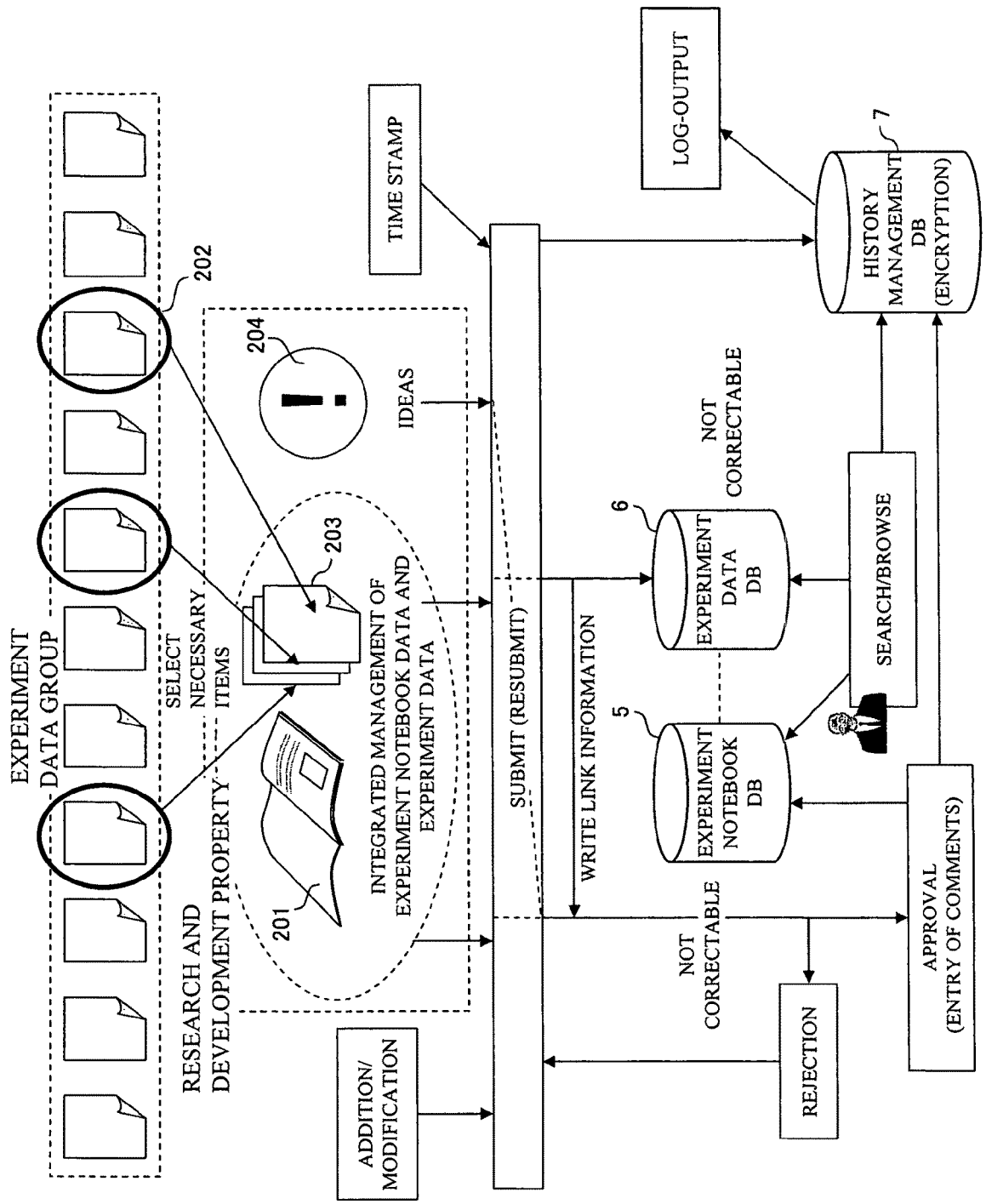
FIG. 2 shows an explanatory diagram of the summary of a function of integrally managing the research and development property composed of experiment notebook data, experiment data, and ideas in the system for managing the property of research and development according to the present invention.

FIG. 2 shows an explanatory diagram of the general outline of a function of integrally managing the research-and-development property comprising experiment notebook data, experiment data, and ideas in the system for managing the property of research and development according to the present invention.

In the present invention, when the research-and-development property comprising experiment notebook data, experiment data, and ideas is stored in the experiment notebook DB5 and the experiment data DB6, experiment notebook data 201 in which necessary description items are described is created, some necessary experiment data 203 is selected from an experiment data group 202 obtained from the experiment measurement apparatus 8, an idea 204 is added, and submission processing is performed.

The experiment notebook data 201 is integrated through an integration editing process, for example, by attaching the experiment data 203 to a predetermined position of the experiment notebook data 201, the data is then converted into such a file format (PDF file: format, for example) that falsification of the data is made impossible, a time stamp is added, and the data is then stored in the experiment notebook DB5.

A time stamp and link information to experiment notebook data are added to the experiment data 203, which is then stored in the experiment data DB6. In this case, in order to prevent falsification, the data is encrypted and then stored. In the history management DB7, the submission history of the experiment notebook data 201 and the experiment data 203 is stored. In this case, in order to prevent falsification, the submission history of the experiment notebook data 201 and the experiment data 203 is also encrypted and stored.

When there are errors in the previously-submitted experiment notebooks or the experiment data, the experimenter can make corrections for resubmission. Also, the experimenter can make addition to the previously-submitted experiment notebooks or the experiment data and then submit the notebooks or the data.

The experimenter and the approver send a request for searching for or browsing the experiment notebook data or the experiment data stored in the experiment notebook DB5 or the experiment data DB6, from the computers that they use. In this way, the experiment notebook data or experiment data corresponding to the search request or the browse request can be referred to.

Among the experiment notebook data stored in the experiment notebook DB5, the approver has the experiment notebook data on which approval decision needs to be made by him/herself displayed on a display screen, checks the description contents, enters comments, and makes a decision of approval or disapproval. The result of the decision is recorded in the experiment notebook DB5, experiment data DB6, and history management DB7.

There are cases in which, as authentication information, biological information such as fingerprints of the experimenter may be added to the experiment notebook data or the experiment data, and the data is then stored in the experiment notebook DB5 or the experiment data DB6.

The submission history or the approval history of the experiment notebook data recorded in the history management DB7 can be log-outputted as needed.

Further, regarding the experiment data paired with and stored with the experiment notebook data, there are some cases where experiment data not directly related to the contents described in the experiment notebook data is selected and stored. When such experiment data not directly related to the contents described in the experiment notebook data is selected and stored, the approver or other researchers can make use of the experiment data for conceiving new ideas or finding errors in experimenters' consideration, for example.

When the experiment notebook data 201 is created, a checking process on whether or not all the required description requirements are described is performed. In this check process, whether or not at least one of the control number of the experiment measurement apparatus 8 used in an experiment, the usage time period of the apparatus, and the signature of the apparatus manager is described is checked, for example. By recording the control number, the usage time period, or the like of the experiment measurement apparatus 8 used in the experiment without fail, with reference to the usage history of the experiment measurement apparatus 8, it becomes possible to confirm that the experiment has actually been conducted, and as a result, the credibility of the experiment data can be enhanced.

Figure 3:
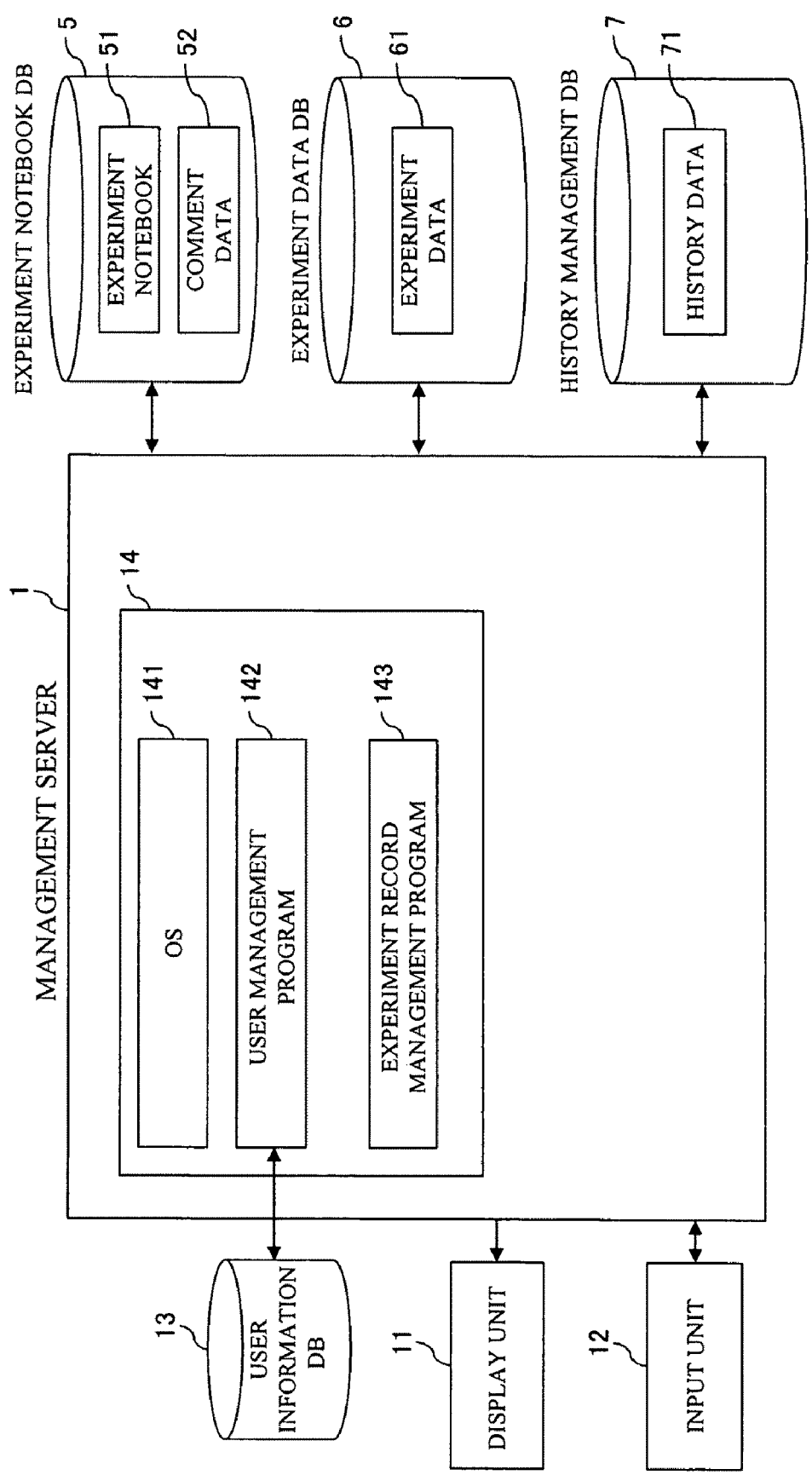
FIG. 3 shows a block diagram of a hardware configuration of a management server.

FIG. 3 shows a block diagram of a hardware configuration of the management server 1, and the management server 1 is provided with a display unit 11, an input unit 12, a user information DB13, and an internal memory 14. An operating system (OS) 141, a user management program 142, and an experiment-record management program 143 are stored in the internal memory 14.

To this management server 1, there are connected the experiment notebook DB5, experiment data DB6, and history management DB7.

The experiment notebook DB5 is adapted such that experiment notebook data 51 and comment data 52 entered when the approver has made a decision are stored.

Experiment data 61 paired with the experiment notebook data 51 is stored in the experiment data DB6.

History management data 71, such as the submission history or approval history of the experiment notebook data, is stored in the history management DB7.

FIG. 4 shows an example of user information stored in the user information DB13, and it includes a user ID (131), password 132, approval authority 133, and user name 134 assigned to each experimenter or approver.

Whether or not the approval authority is present is set in the approval authority 133. In this case, for a user both as an experimenter and an approver who makes a decision on the experiment notebook data of other experimenters (in the example of FIG. 4, assistant professor Tanaka having a user ID=LS456), two passwords are assigned: one used in cases in which the assistant professor logs in as a person having approval authority; and the other used in cases in which the assistant professor logs in as experimenter having no approval authority.

Figure 5:
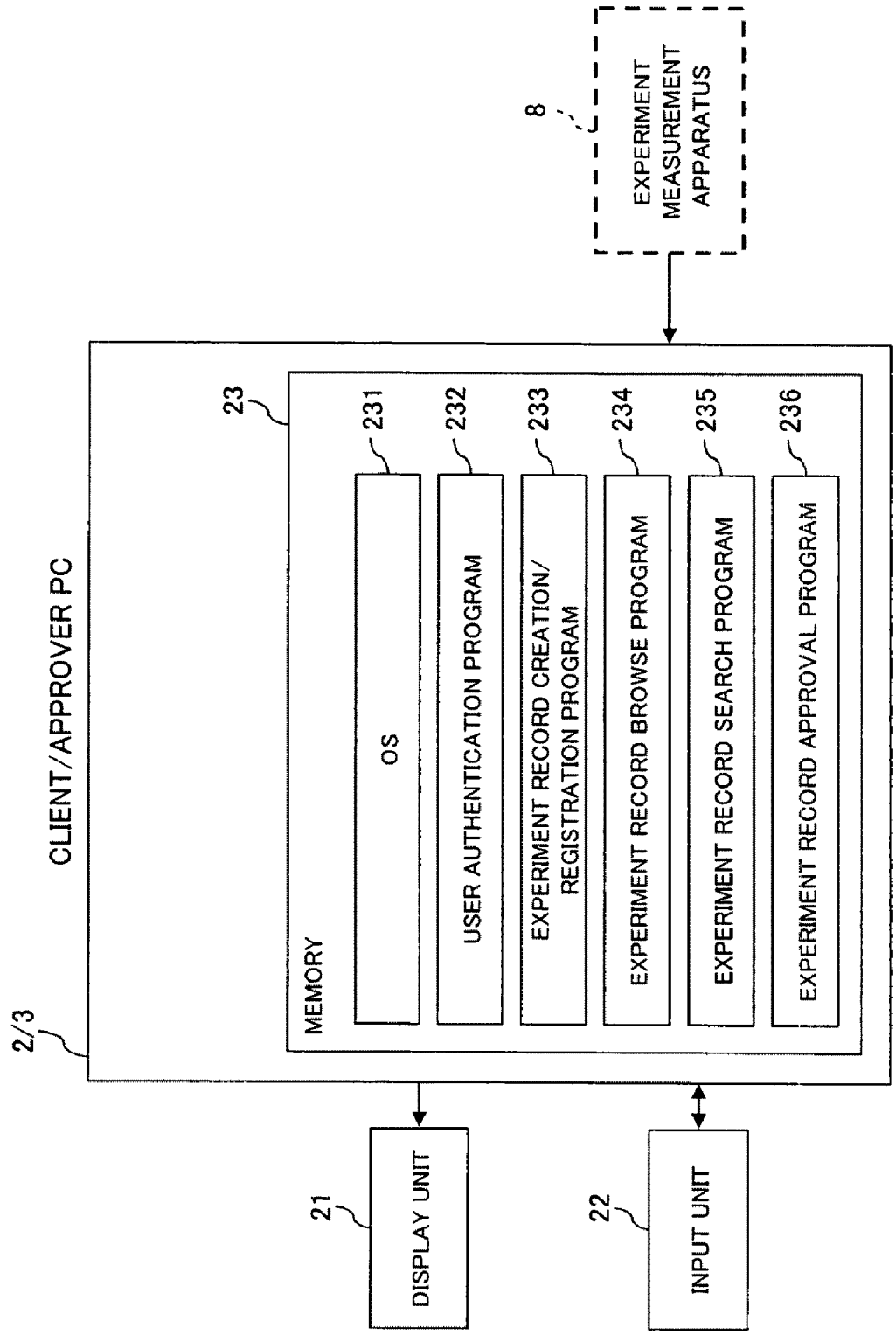
FIG. 5 shows a block diagram of a hardware configuration of a client PC2/approver PC3 used by an experimenter and an approver.

FIG. 5 shows a block diagram of a hardware configuration of the client PC2/approver PC3 used by the experimenter and the approver, and the client PC2/approver PC3 comprises a display unit 21, an input unit 22 including a keyboard, a mouse, and the like, and an internal memory 23. In the internal memory 23, an OS 231, a user authentication program 232, an experiment-record creation/registration program 233, an experiment record browse program 234, an experiment record search program 235, and an experiment record approval program 236 are stored.

The experiment record approval program 236 is stored in the approver PC3 only. However, note that the experiment record approval program 236 is also stored in the client PC2 of a researcher who has approval authority and who could be a submitter of his/her own experiment notebook. In such case, the researcher is subjected to user authentication based on the password for a person having approval authority, and upon successful user authentication, the computer functions as the approver PC.

Further, experiment data obtained by the experiment measurement apparatus 8 can be retrieved via a removable recording medium or communication line.

Figure 6:
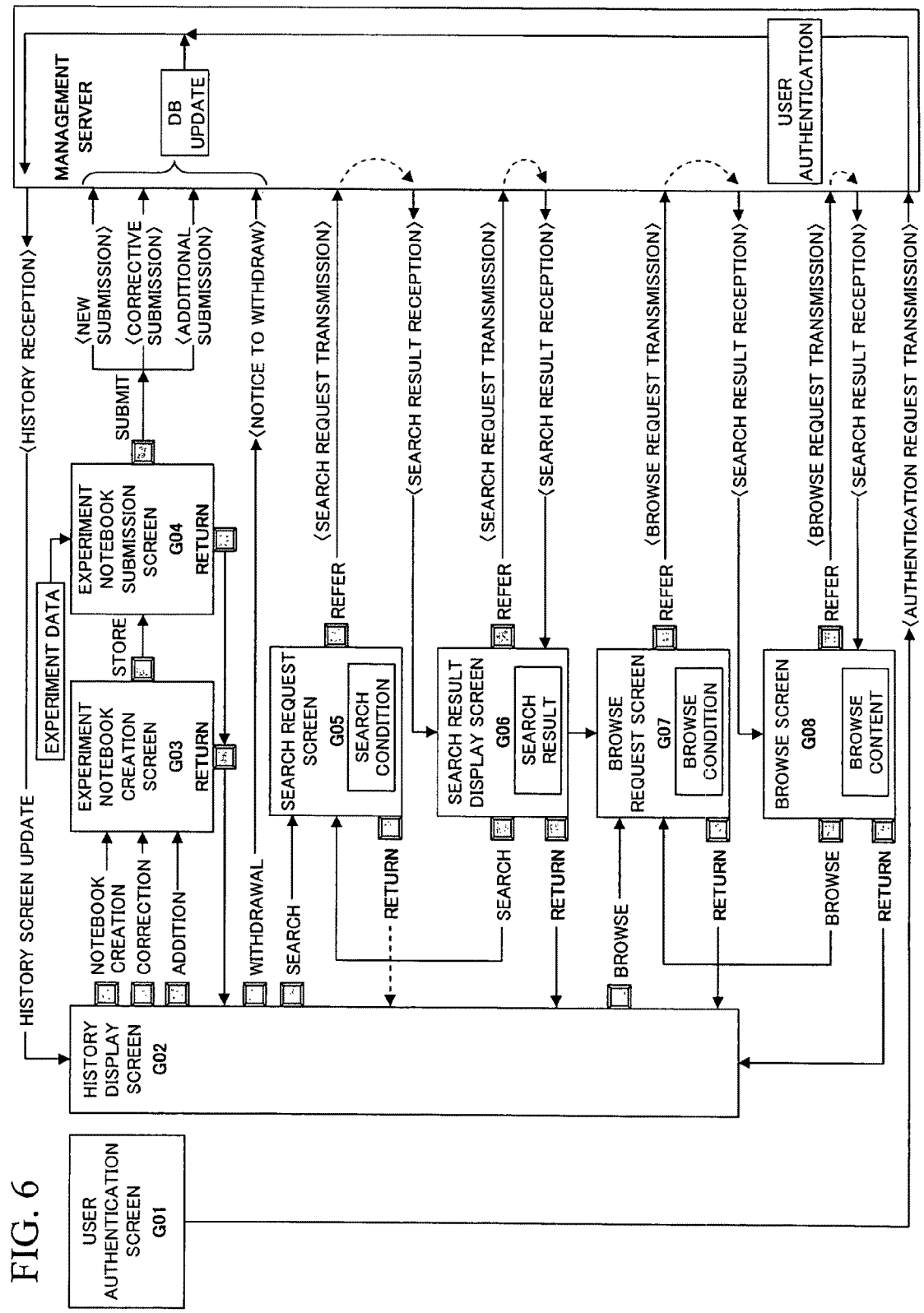

FIG. 6 shows a screen transition diagram indicating, for example, cases in which the experimenter creates experiment notebook data with the use of his/her own client PC2 or searches for experiment notebook data stored in a database of the management server 1, based on the embodiment of FIG. 1.

Figure 7:
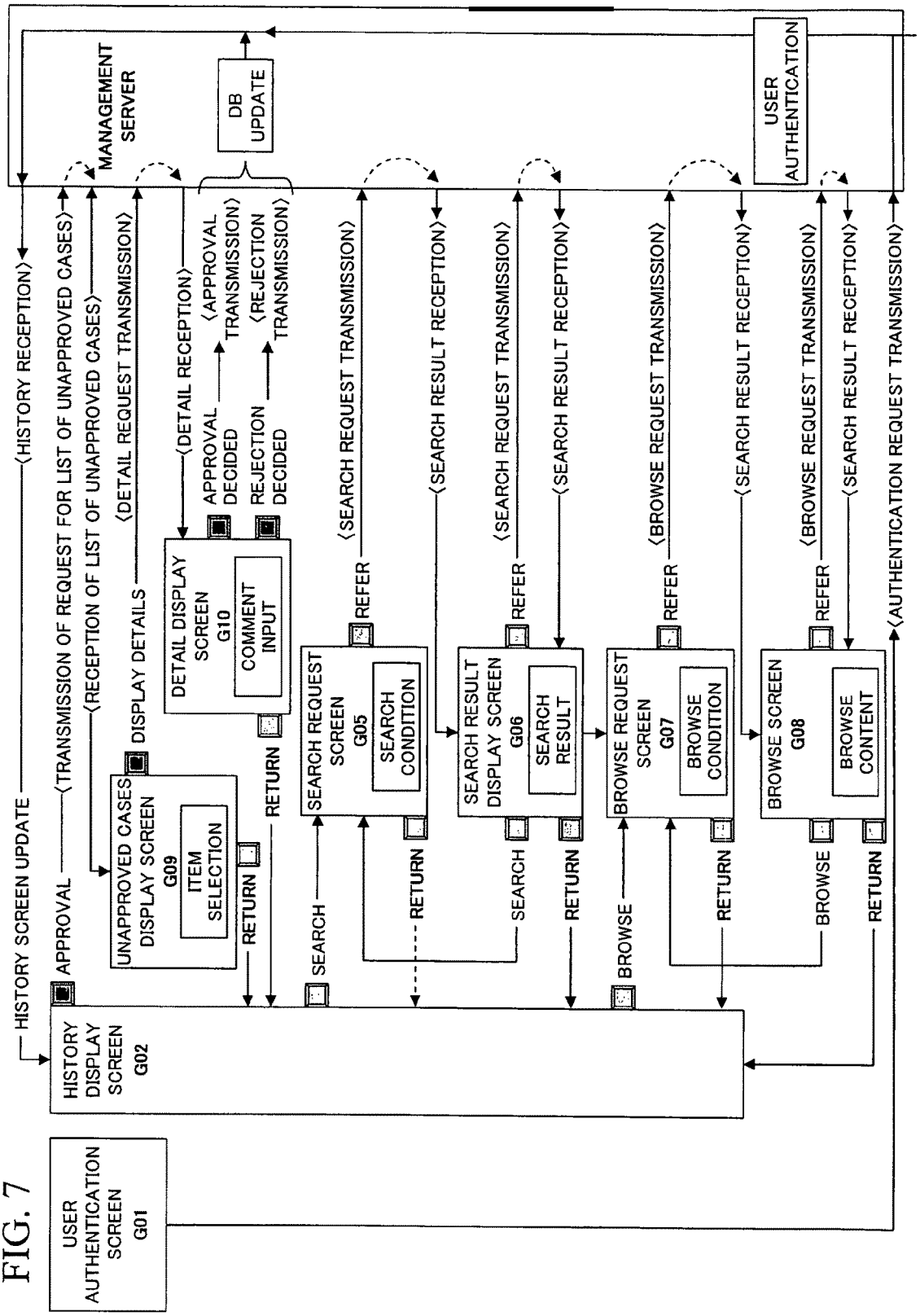
FIG. 7 shows screen transitions in cases in which, for example, a decision of approval or rejection is made on experiment notebook data stored in a database of the management server 1 by use of the approver PC3.

FIG. 7 shows a screen transition diagram indicating, for example, cases in which the approver makes a decision of approval or rejection on experiment notebook data stored in a database of the management server 1 with the use of his/her own approver PC3, based on the embodiment of FIG. 1.

In FIG. 6, when the user authentication program 232 of the client PC2 used by the experimenter is activated, a user authentication screen G01 is displayed on the display screen of the display unit 21.

On the screen, the experimenter enters the user ID and password assigned to him/herself, and they are sent to the management server 1 as user authentication information. The user management program 142 of the management server 1 executes user authentication based on the received user authentication information, and when a valid user registered in the user information DB 13 is recognized, the server 1 sends back a message indicating successful user authentication and the history information including both the submission history of the experiment notebooks of the user up to now and approval history by the approver, to the client PC2.

Upon receiving the message indicating successful user authentication, the user authentication program 232 of the client PC2 activates the experiment-record creation/registration program 233, and it sends the history information received from the management server 1 to the experiment-record creation/registration program 233.

The experiment-record creation/registration program 233 displays a history display screen G02, and the history information is displayed thereon.

Figure 8:
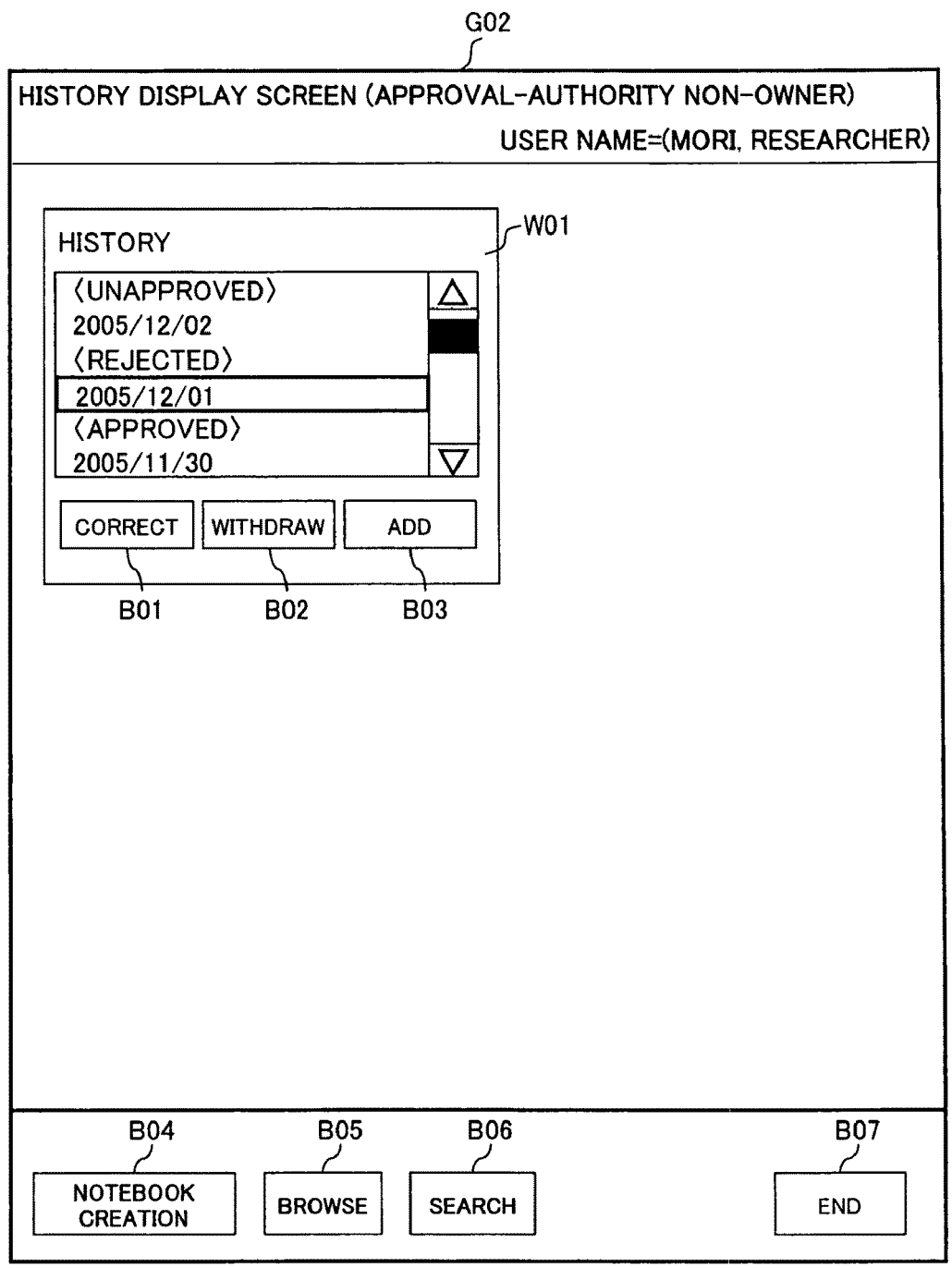
FIG. 8 shows an example of a history display screen G02 when the user name indicates "researcher Mori."

FIG. 8 shows an example of the history display screen G02 in cases in which the user name is "researcher Mori," and as shown in the figure, the submission history of the researcher's (experimenter's) experiment notebooks and approval or rejection history up to now are displayed in a history window W01 in order by date.

At this time, a "Correct" button B01, a "Withdraw" button B02, and an "Add" button B03 are displayed in the history window W01. Further, a "Create Notebook" button B04, a "Browse" button B05, a "Search" button B06, and an "End" button B07 are displayed at the bottom portion of the history display screen G02.

When there are errors in previously-submitted experiment notebook data, the "Correct" button B01 in the history window W01 is used for resubmitting a corrected version of the experiment notebook data.

The "Withdraw" button B02 is used when previously-submitted experiment notebook data is withdrawn by the experimenter on his/her own free will, and as in the case of the "Correct" button B01, the data that can be withdrawn is unapproved experiment notebook data alone on which no approval decision has been made by the approver.

The "Add" button B03 is used when an entry is added to the description items of a previously-submitted experiment notebook data. Alternatively, it is used when adding and submitting the experiment notebook data of other results of an experiment different in experiment method or the like, along with a continued research on a previously-submitted experiment notebook data. The "Add" button B03 is used on the premise that previously-submitted experiment notebook data has been registered.

The "Create Notebook" button B04 is used when an experiment notebook is newly created and submitted.

The "Browse" button B05 is used when experiment notebook data stored in the experiment notebook DB5 is browsed.

The "Search" button B06 is used when experiment notebook data stored in the experiment notebook DB5 is searched for.

The "End" button B07 is operated when the experiment-record creation/registration program 233 is ended.

Figure 9:
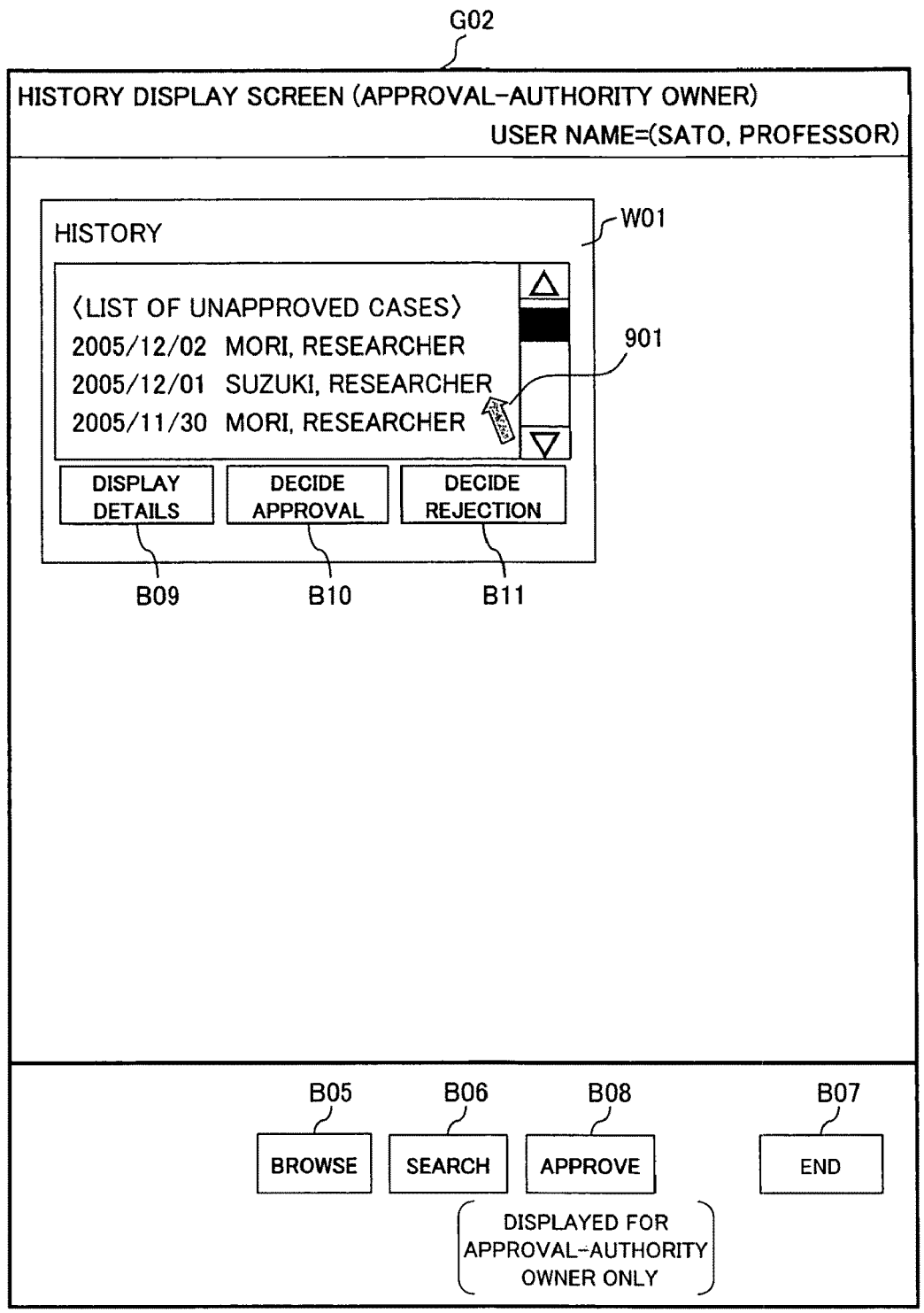
FIG. 9 shows an example of the history display screen G02 of the approver PC3 when "user name=professor Sato" having approval authority.

FIG. 9 shows an example of the history display screen G02 of the approver PC3 of "user name=Professor Sato" having approval authority. As shown in the figure, the researcher's (approver's) list of unapproved experiment notebooks up to now is displayed in the history window W01 in order by date.

A "Display Details" button B09, an "Approve" button B10, and a "Reject" button B11 are displayed in the approver's history window W01.

Further, at the bottom of the history display screen G02, the "Browse" button B05, the "Search" button B06, an "Approve" button B08, "End" button B07 are displayed. On the screen, since the user is a person having approval authority, the "Create Notebook" button is not displayed.

The "Display Details" button B09 is used for displaying the detailed contents of any one of the experiment notebooks in the list of unapproved experiment notebooks on the display screen G02. When any one of the experiment notebooks in the list of unapproved experiment notebooks is selected with a mouse cursor 901, and the "Display Details" button B09 is depressed, the detailed contents of the experiment notebook are displayed. The approver checks the contents and depresses the "Approve" button B10, thereby making a decision of approval. Alternatively, a decision of rejection is made by depressing the "Reject" button B10.

The "Browse" button B05, the "Search" button B06, and the "End" button B07 have the same functions as those of the experimenter not having approval authority.

When the "Create Notebook" button B04 is depressed in a state in which the history window W01 of FIG. 8 is displayed, the experiment-record creation/registration program 233 displays an experiment notebook creation screen G03.

Figure 10:
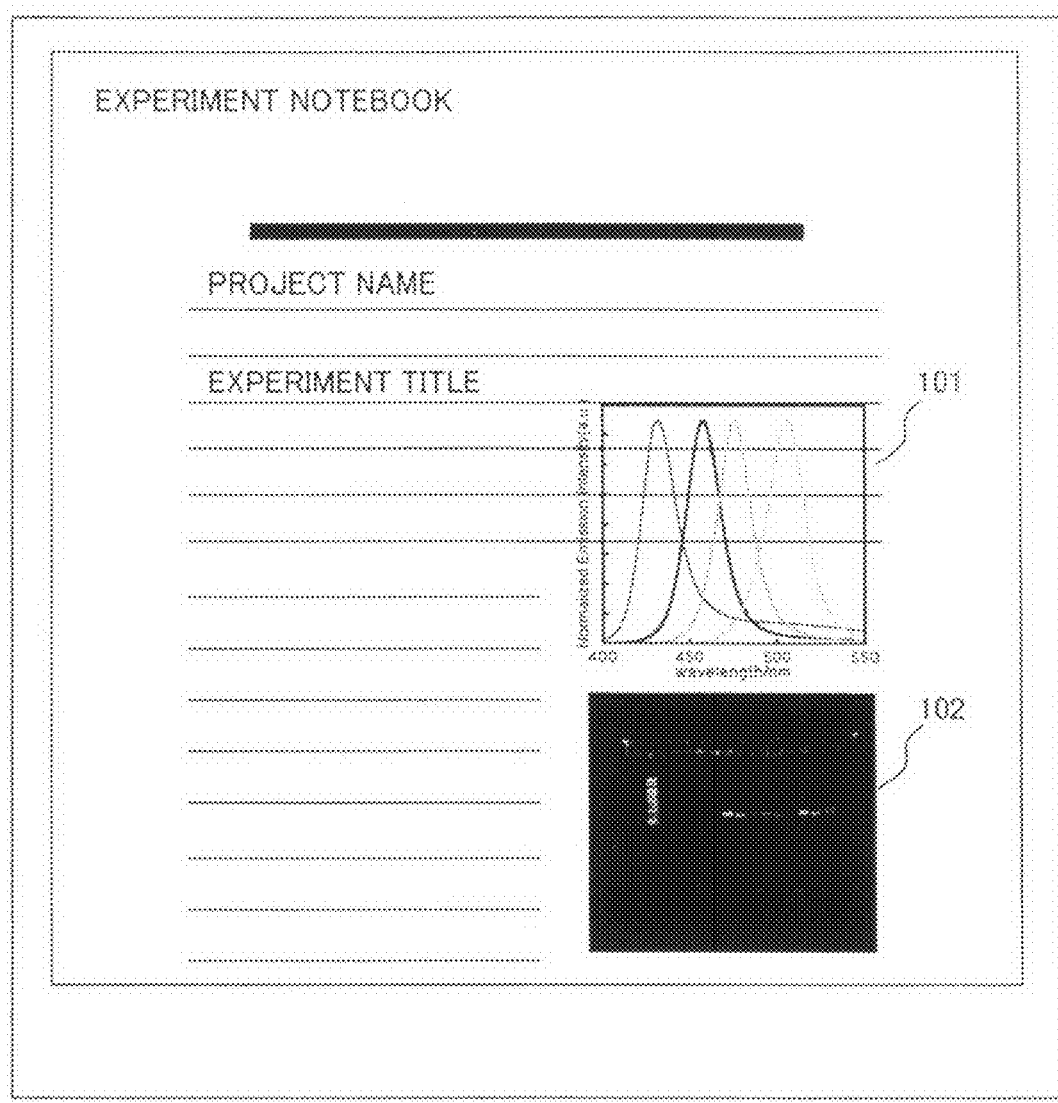
FIG. 10 shows an example of a computerized experiment notebook.

In the present invention, as exemplified in FIG. 10, a computerized experiment notebook refers to a notebook that is integrally edited by attaching a chart 101 or a photograph 102, which is obtained as an experiment result, to the description contents such as a project name and experiment items, and that is then converted into file format (PDF file format) to which access is allowed for reference purposes only.

The experiment notebook creation screen G03 is used for entering description contents such as a project name and experiment items.

In the present embodiment, for allowing the entry of necessary items in a predetermined format, the experiment notebook creation screen G03 such as the one exemplified in FIG. 11 is displayed.

In the example of FIG. 11, there is displayed an entry field for each of the description items such as a project name, an experiment item, an experiment date, and an idea The experiment notebook creation screen G03 is made so that the content can be entered in each entry field.

In this case, required description items are clearly specified by a symbol "*."

At the top of the experiment notebook creation screen G03, there are provided: check boxes for identifying whether the experiment notebook indicates which one of the types; that is, "Create New," "Correct," or "Add," and check boxes for identifying whether the description contents are composed of experiment notebooks and experiment data, whether they are composed of experiment notebooks, experiment data, and an idea, or whether they are composed of an idea alone.

When the submission type indicates "Create New" or "Correct," description item check processing to be described later is performed. However, when it indicates "Add," since there are cases in which the experiment item or the experimenter is skipped, the description item check processing is not performed.

A "Save" button B12 and a "Return" button B13 are displayed at the bottom of the experiment notebook creation screen G03.

The "Save" button B12 is used for temporarily storing the experiment notebook created on the experiment notebook creation screen G03 as an experiment notebook file, and upon depressing this "Save" button B12, the screen changes to an experiment notebook submission screen G04.

The "Return" button B13 is used for returning to the history display screen G02.

On the experiment notebook submission screen G04, as shown in FIG. 12, for example, a registration data window W02 is displayed adjacent to the history window W01.

Figure 13:
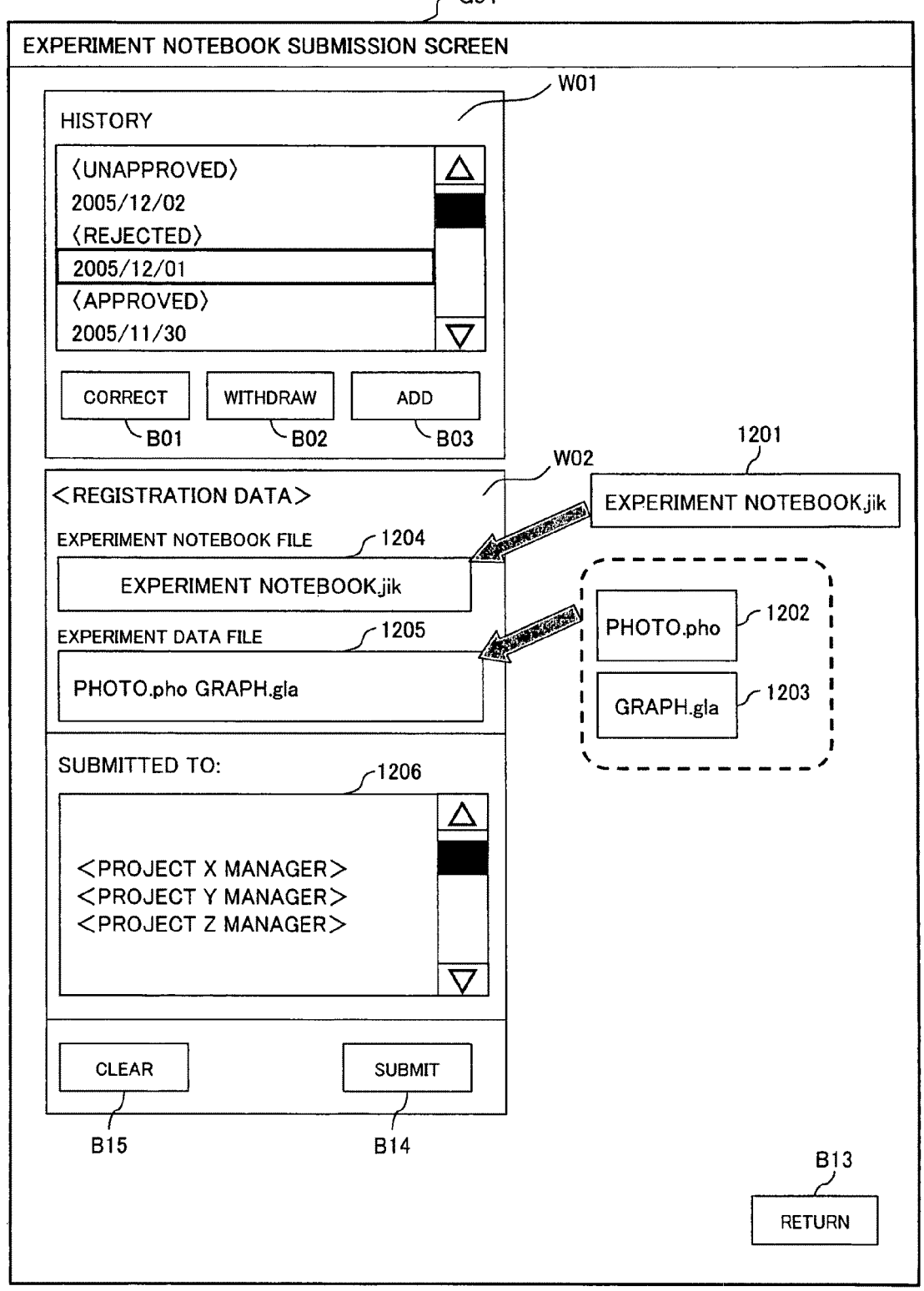
FIG. 13 shows the operation of registering both an experiment notebook file created on the experiment notebook creation screen G03 and an experiment data file, through a drag-and-drop operation, into registration areas.

As shown in FIG. 13, an experiment notebook file 1201 created on the experiment notebook creation screen G03 is registered in the experiment notebook-file registration area 1204 by a drag-and-drop operation, and a photograph file 1202 and a graph file 1203 obtained by the experiment measurement apparatus 8 are registered in a experiment data file registration area 1205 by a drag-and-drop operation. Next, the approver is selected and specified among a plurality of submission destinations displayed in a submission destination selection area 1206.

One or a plurality of submission destinations may be specified.

Upon selection of the submission destination, when a "Submit" button B14 displayed at the bottom of the registration data window W02 is depressed, the experiment notebook file 1201, the photograph file 1202, the graph file 1203 registered in the registration data window W02 are sent to the management server 1 as registration data. In this case, the data is provided with a message indicating that the data is newly-submitted registration data and it is then sent to the management server 1.

Figure 14:
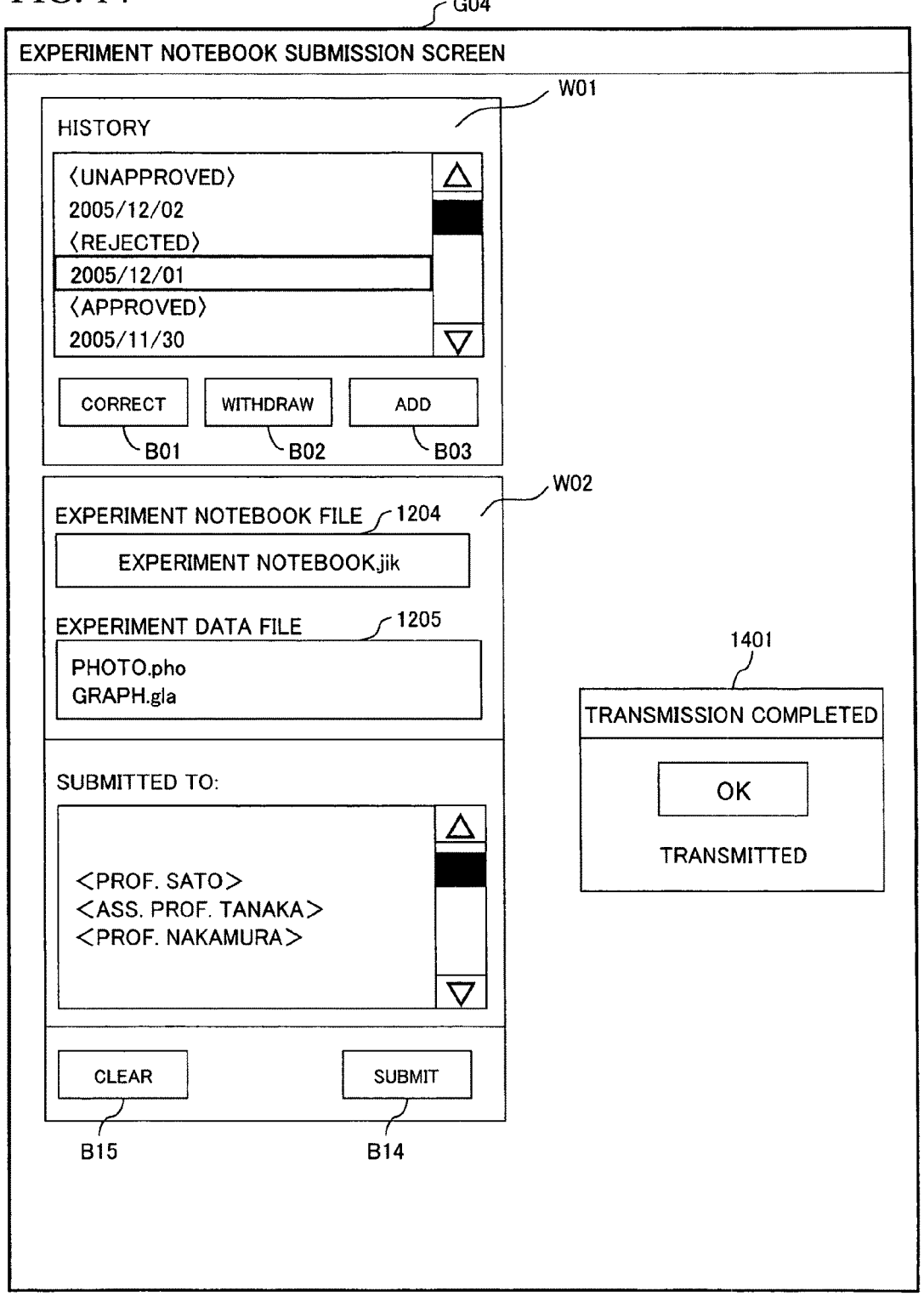
FIG. 14 shows an example of a dialog box indicating the completion of the transmission.

Upon the completion of the transmission, a dialog box 1401 indicating the completion of the transmission is displayed as shown in FIG. 14.

The management server 1 attaches the photograph data and the graph data in the photograph file 1202 and the graph file 1203 to the experiment notebook data in the received experiment notebook file 1201, and the data is integrally edited. Next, the data is converted into PDF file format, and it is then stored in the experiment notebook DB5. Further, the photograph file 1202 and the graph file 1203 are provided with link information to the experiment notebook data converted into PDF file format, and they are then stored in the experiment data DB6.

When the experiment notebook file 1201, the photograph file 1202, or the graph file 1203 registered in the registration data window W02 need to be changed, a "Clear" button B15 is depressed so as to delete them, and a new experiment notebook file or photograph file is registered.

When the experiment notebook data and the experiment data are registered in the relevant databases, the management server 1 records the submission history in the history management DB7, and it sends back new history data to the client PC2 from which the experiment notebook has been submitted.

Figure 15:
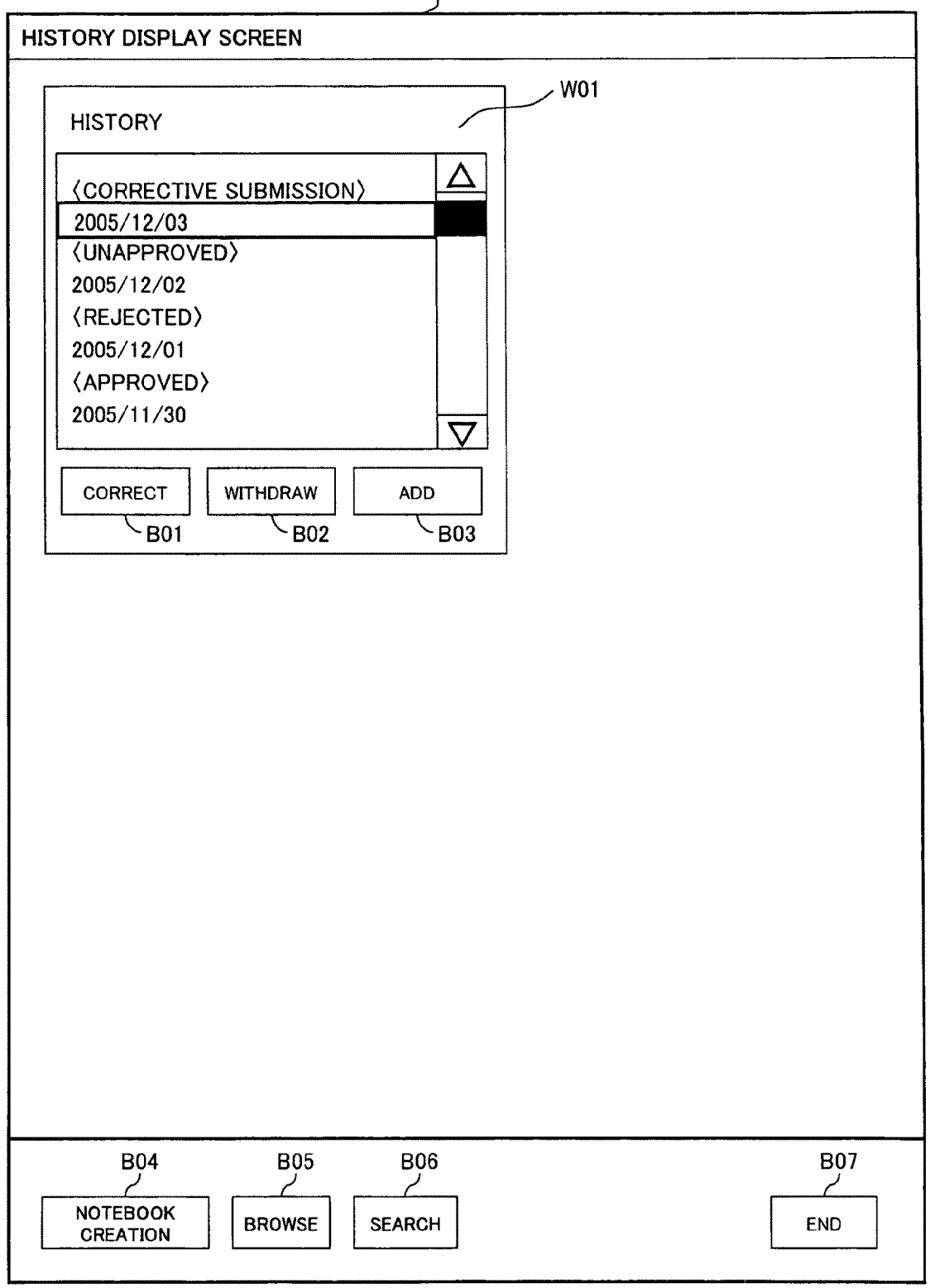
FIG. 15 shows an example of the history display screen G02 on which newly-submitted experiment notebook data is additionally displayed in the history window W01 upon receiving history data.

Upon receiving the history data, the experiment-record creation/registration program 233 displays the history display screen G02 as shown in FIG. 15, and the experiment notebook data newly submitted is additionally displayed in the history window W01.

In the present embodiment, when the "Submit" button B14 is depressed, it is checked whether or not all the required description items have been entered prior to the transmission of experiment notebook data to the management server 1. If not, as shown in FIG. 16, a dialog box 1601 indicating an error in regard to an omission of required description items is displayed, so as to request for re-creating the data. When there is an omission of required description items, the data is not transmitted to the management server 1.

When previously-submitted experiment notebook data is corrected, relevant submitted experiment notebook data is selected from the history window W01 on the history display screen G02 of FIG. 8, and the "Correct" button B01 is depressed. The screen then changes to the experiment notebook creation screen G03, a corrected version of experiment notebook data is created. Next, the corrected experiment notebook data and the experiment data are registered in the registration data window W02 by a drag-and-drop operation, and the "Submit" button B14 is depressed.

Thus, the data is sent to the management server as experiment notebook data submitted after correction. In such case, a message indicating that the data has been submitted after correction is added to the transmitted data.

When an addition is made to previously-submitted experiment notebook data, submitted experiment notebook data is selected from the history window W01 on the history display screen G02 of FIG. 8, and the "Add" button B03 is depressed. The screen changes to the experiment notebook creation screen G03, and experiment notebook data to be added is then created. Next, the experiment notebook data to be added and experiment data are registered in the registration data window W02 by a drag-and-drop operation, and the "Submit" button B14 is depressed.

Thus, the data is sent to the management server as experiment notebook data submitted after addition. In the case of such submission after addition, there are cases in which no experiment data is present. In such case, a message indicating that data has been submitted after addition is added to the transmitted data.

In the case of a submission after correction, as in the case of a new submission, the experiment-record creation/registration program 233 checks the description requirements. If there is an omission, a message indicating the omission is displayed.

The experiment notebook data submitted after correction and the experiment notebook data submitted after addition are provided with link information to the experiment notebook data prior to the correction or addition, and they are then stored in the experiment notebook DB5. The submission type is set to be "Submitted after Correction" or "Submitted after Addition."

When previously-submitted experiment notebook data is withdrawn, submitted experiment notebook data is selected from the history window W01 on the history display screen G02 of FIG. 8, and the "Withdraw" button B02 is depressed. Next, notification of withdraw is sent to the management server 1, and the status of the experiment notebook data and experiment data stored in the experiment notebook DB5 and the experiment data DB6 is set to be "Withdrawn." Note that even when such withdrawal operation has been conducted, neither the submitted experiment notebook data nor the experiment data is to be deleted.

Next, screen transitions concerning the functions of browsing and searching for experiment notebook data, which functions are commonly used by both the experimenter and the approver, will be described.

Figure 17:
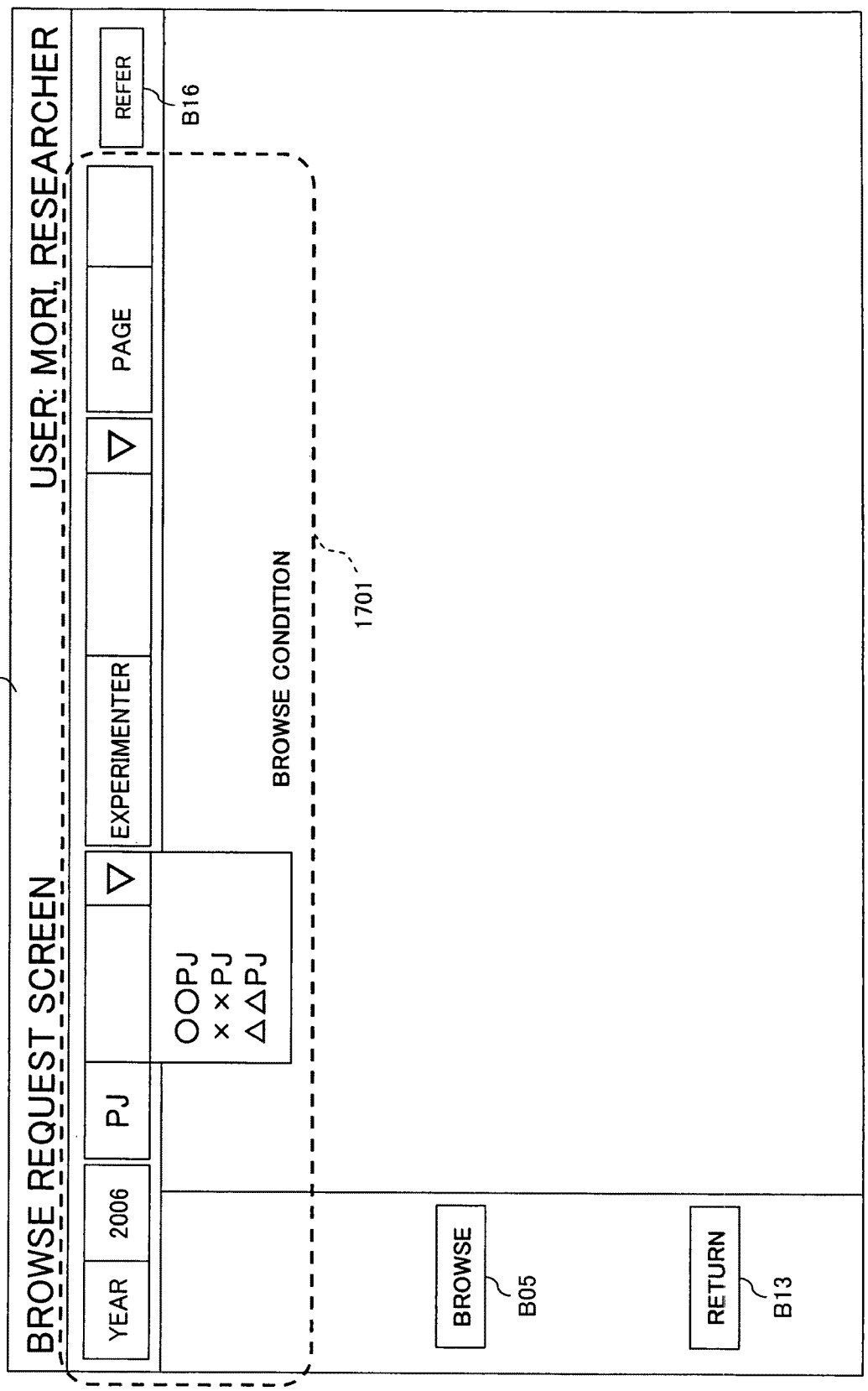
FIG. 17 shows an example of the browse request screen G07.

First, when the "Browse" button B05 is depressed on the history display screen G02 of FIG. 8, the experiment record browse program 234 is activated, and the screen changes to a browse request screen G07. On this browse request screen G07, as exemplified in FIG. 17, a browse condition designation area 1701 including the year, the project name, the experimenter, and the page of the experiment notebook data to be browsed is displayed.

Next, when any browse condition is entered and a "Refer" button B16 is depressed, a browse request having the entered browse condition is sent to the management server 1.

The management server 1 searches the experiment notebook DB5 and the experiment data DB6 for the experiment notebook data or the experiment data satisfying the received browse condition, and it sends back a search result to the client PC2 or the approver PC3 from which the browse request has been sent.

The experiment record browse program 234 of the client PC2 from which the browse request has been sent displays the experiment notebook data or the experiment data, which is the received search result, on a browse screen G08.

FIG. 18 shows an example of the browse screen G08. In this example, experiment notebook data in PDF file format is displayed in the middle of the screen. On the right side of the screen, summary information concerning the experiment notebook data, link information to the experiment data, the dates on which the approver made comments, and the update history dates (dates of the submission after addition, correction, and the like) of the experiment notebook data are displayed.

When one of the dates of the comments is selected and the "Refer" button B16 is depressed, the reference request is sent to the management server 1, the details of the comments are received from the management server 1, and they are displayed on the browse screen.

When the "Return" button B13 on the browse screen G08 is depressed, the screen returns to the history display screen G02 of FIG. 8. When the "Browse" button B05 is depressed, the screen returns to the browse request screen G07 of FIG. 17.

Figure 19:
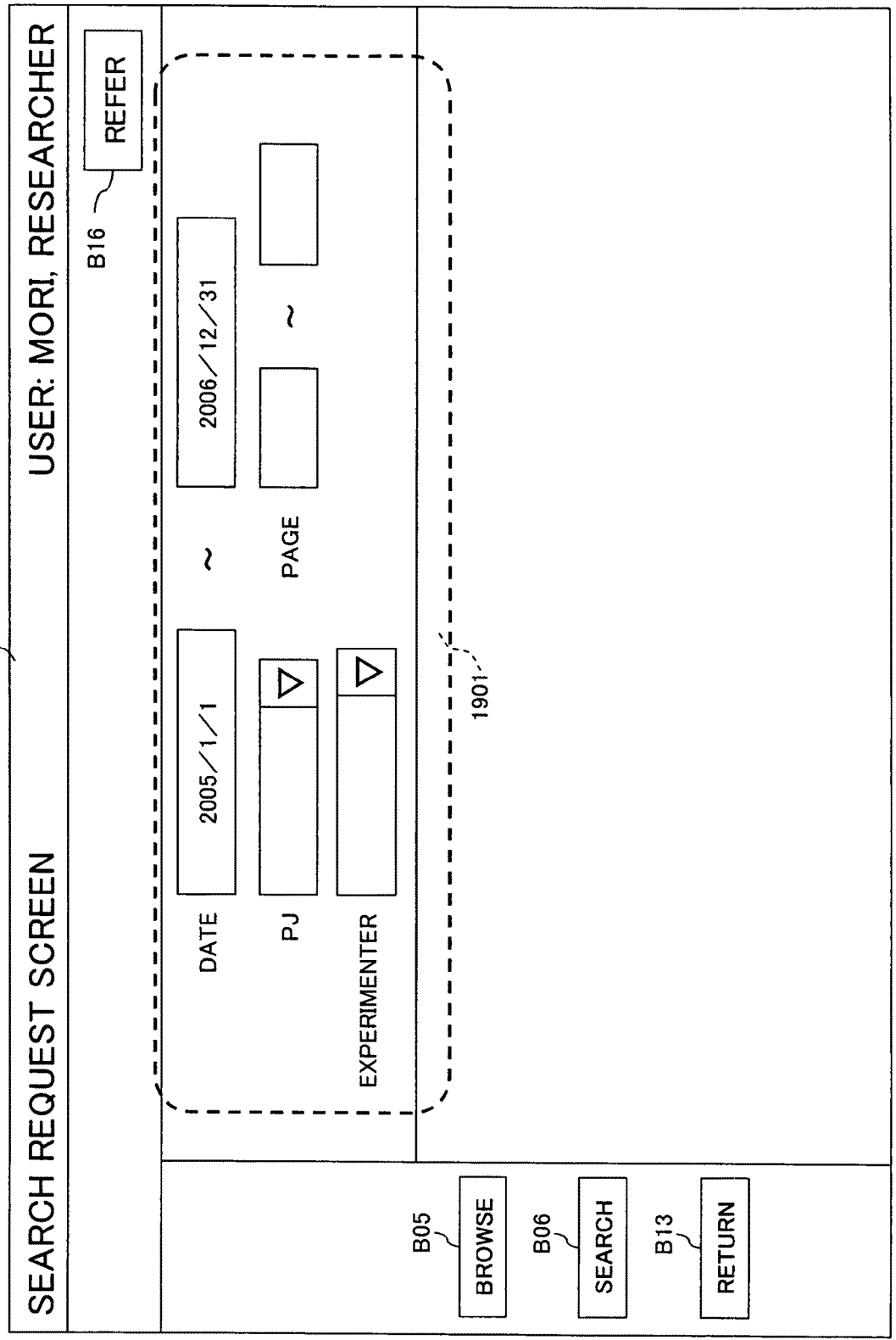
FIG. 19 shows an example of a search request screen G05.

Next, when the "Search" button B06 is depressed on the history display screen G02 of FIG. 8, the experiment-record search program 235 is activated, and the screen changes to a search request screen G05. On this search request screen G05, as exemplified in FIG. 19, a browse condition designation area 1901 including the dates, the project name, the experimenter, and the pages concerning the experiment notebook data to be searched for is displayed.

When any search condition is entered and the "Refer" button B16 is depressed, a search request having the entered search condition is sent to the management server 1.

The management server 1 searches the experiment notebook DB5 and experiment data DB6 for the experiment notebook data or the experiment data satisfying the received search condition, and the search result is sent back to the client PC2 or the approver PC3 from which the search request has been sent.

The experiment-record search program 235 of the client PC2 from which the search request has been sent displays the experiment notebook data or the experiment data, which is the received search result, on a search result display screen G06.

FIG. 20 shows an example of the search result display screen G06. In this example, a list of the experiment notebook data satisfying the search condition is displayed in order by date.

When any data in the list is selected and the "Refer" button B16 is depressed, the experiment-record search program 235 sends the reference request to the management server 1. Upon receiving the details of the experiment notebook data, they are displayed on the search result screen G06.

When the "Return" button B13 on the search result display screen G06 is depressed, the screen returns to the history display screen G02 of FIG. 8. And, when the "Search" button B06 is depressed, the display returns to the search request screen G05 of FIG. 19.

Next, screen transitions unique to the approver PC3 having approval authority will be described with reference to FIG. 7.

The difference between the screen transition of the approver PC3 and that of the client PC2 of an experimenter (FIG. 6) is that, while the notebook creation screen G03 is not present in the approver PC3, an unapproved case display screen G09 is present therein instead. The screens for the search function and the browse function are common to both of the approver PC3 and the client PC2.

Thus, the point of difference alone will be described.

Upon completion of user authentication processing, the history display screen G02 of FIG. 9 is displayed on the display screen of the approver PC3.

In this state, in order to confirm a latest list of unapproved cases, the approver depresses the "Approve" button B08, whereby the experiment record approval program 236 is activated.

Figure 21:
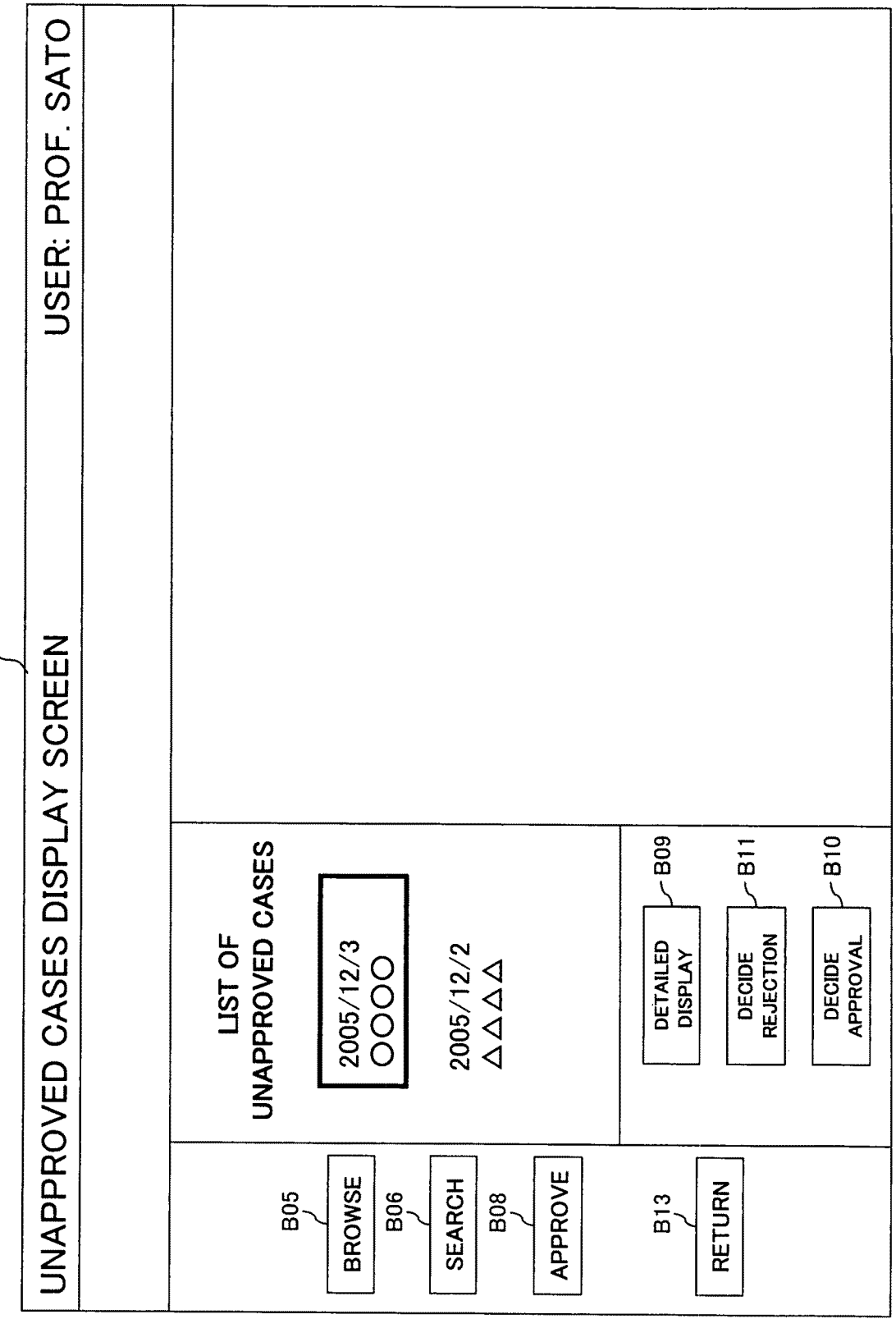
FIG. 21 shows an example of an unapproved case list display screen G09.

In order to obtain such a latest list of unapproved cases from the management server 1, the experiment record approval program 236 sends a request for a list of unapproved cases to the management server 1. Upon receiving a latest list of unapproved cases from the management server 1, the unapproved case list display screen G09 exemplified in FIG. 21 is displayed.

In this case, each of the experiment notebook data in the unapproved case list is provided with a notebook ID.

Below the unapproved case list, the "Display Details" button B09, the "Approve" button B10," and the "Reject" button B11 are displayed.

Next, when any one of the experiment notebook data in the unapproved list is selected by operating a mouse cursor and the "Display Details" button B09 is depressed, the experiment record approval program 236 requests for sending back the detailed data, in order to obtain the selected experiment notebook data from the management server 1.

Upon receiving the requested experiment notebook data from the management server 1, an unapproved case detail display screen G10 as exemplified in FIG. 22 is displayed.

A comment entry field 2201 is displayed on the unapproved case detail display screen G09, and the "Approve" button B10 and "Reject" button B11 are also displayed.

The approver confirms the experiment notebook data displayed in detail and determines whether to make a decision of approval or a decision of rejection. Based on the decision, comments are entered in the comment entry field 2201 with the input unit 22, and the "Approve" button B10 or "Reject" button B11 is depressed.

In accordance with such operation for making a decision, the experiment record approval program 236 sends a message indicating a decision of approval or a decision of rejection to the management server 1. In this case, the message indicating a decision of approval or a decision of rejection is provided with the notebook ID of the target experiment notebook data.

The management server 1 receives the message indicating a decision of approval or a decision of rejection, searches for the relevant experiment notebook data stored in the experiment notebook DB5 with the use of the notebook ID with which the message indicating a decision of approval or a decision of rejection is provided, and updates the status to be "Rejected" or "Approved." Further, the status of the history management DB7 is updated in the same manner.

Next, the details of the processing of each of the programs in the client PC2, the approver PC3, and the management server 1 will be described with reference to the flowcharts.

Figure 23:
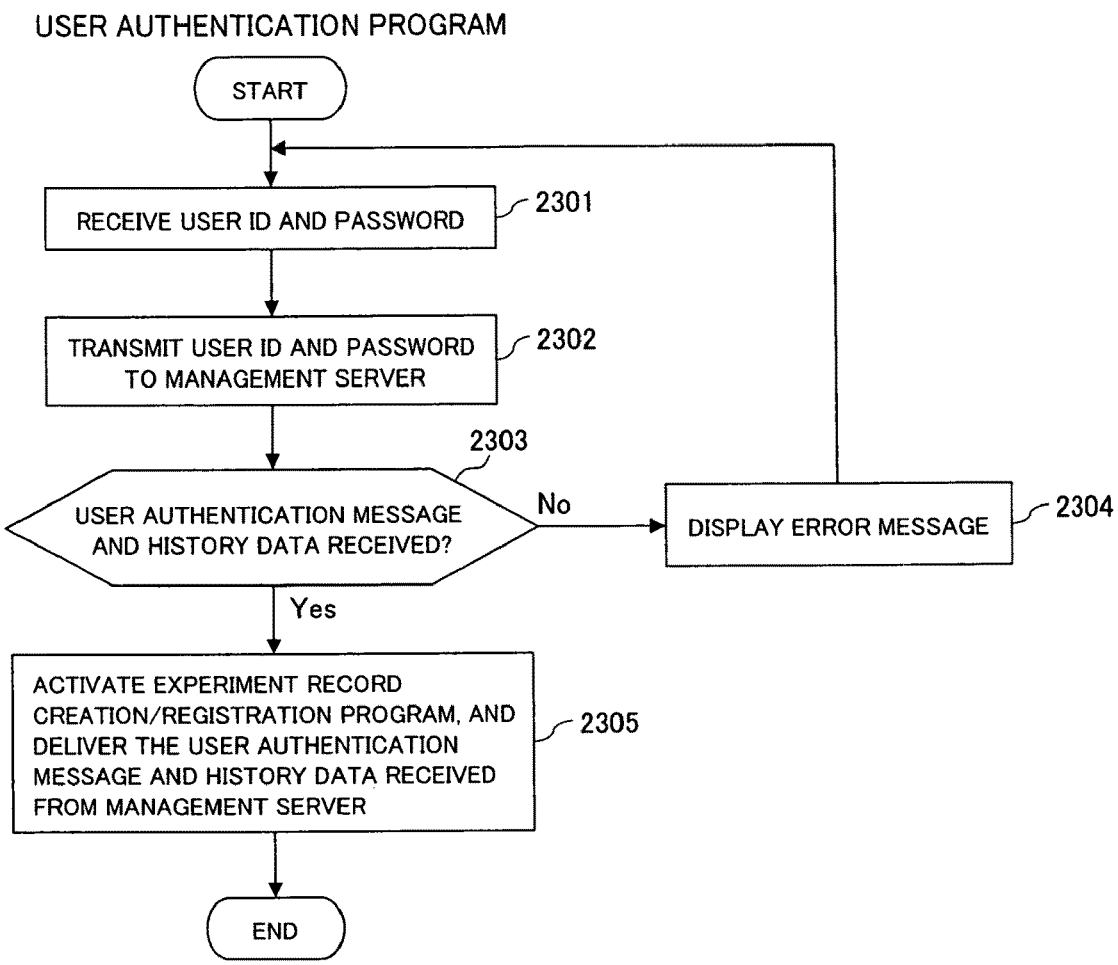
FIG. 23 shows a flowchart of the processing performed by a user authentication program in the client PC2/approver PC3.

FIG. 23 shows a flowchart of the processing performed by the user authentication program 232 in the client PC2 or the approver PC3.

The user authentication program 232 receives a user ID and a password from the input unit 22 (step 2301) and sends the received user ID and password to the management server 1 (step 2302). Next, it is determined whether a user authentication message and history data are received from the management server 1 (step 2303). If they have not been received, an error message indicating unsuccessful user authentication is displayed (step 2304), and the flow returns to the step 2301.

When the user authentication message and history data have been received, the experiment-record creation/registration program 233 is activated, and the user authentication message and history data received from the management server 1 are passed (step 2305).

Figure 24:
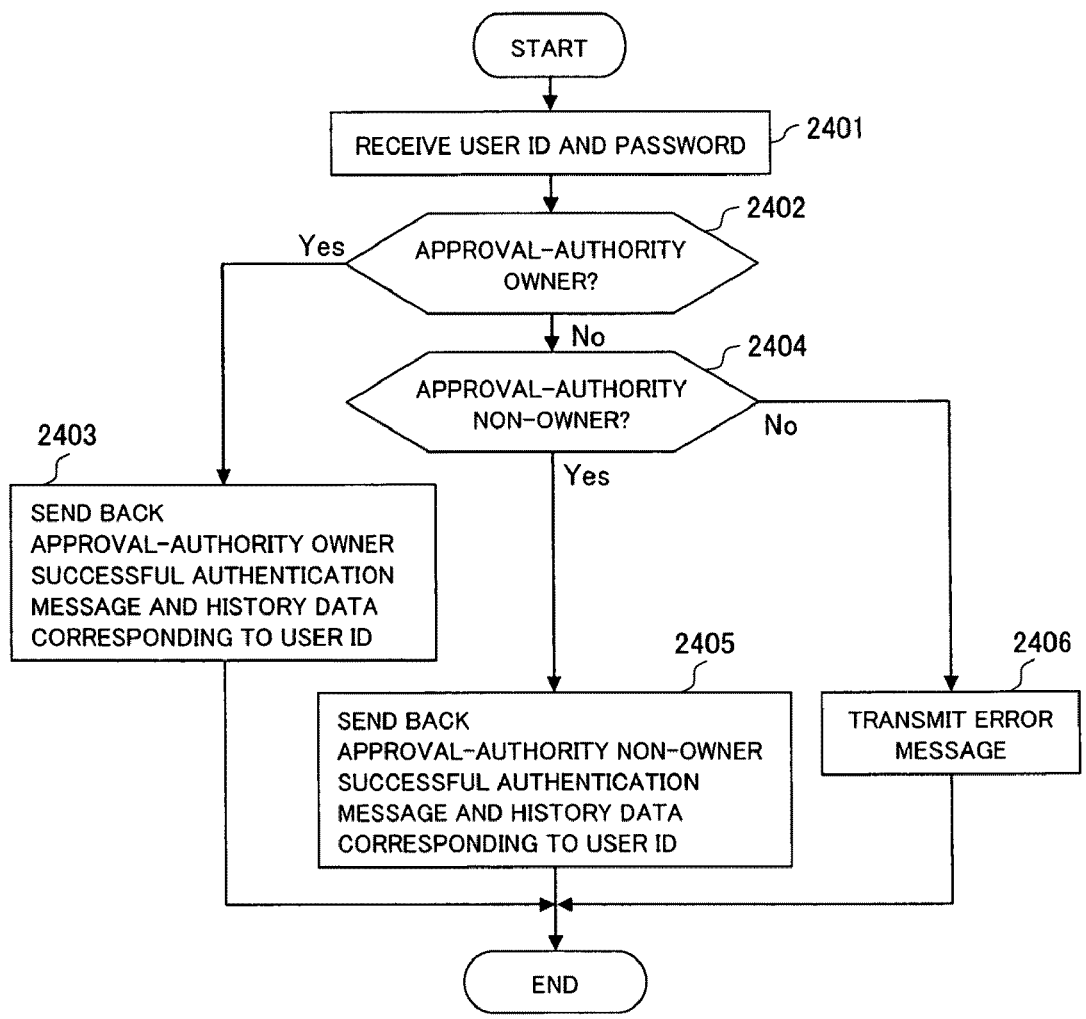
FIG. 24 shows a flowchart of the processing performed by a user management program in the management server.

FIG. 24 shows a flowchart of the processing performed by the user management program 143 in the management server 1.

When the user management program 143 receives a user ID and a password from the client PC2 or the approver PC3 (step 2401), it refers to the contents registered in the user information DB13, so as to determine whether or not the client PC2 or the approver PC3 has approval authority (step 2402). If it has approval authority, a message indicating successful authentication of an approval authority owner and the history data corresponding to the user ID are sent back to the approver PC3 from which the user ID has been sent (step 2403).

Regarding cases in which the person does not have approval authority, it is determined whether or not the person is an approval authority non-owner by referring to the contents registered in the user information DB13 (step 2404). If it is determined that the person is an approval authority non-owner, a message indicating successful authentication of an approval authority non-owner and the history data corresponding to the user ID are sent back to the client PC2 from which the user ID has been sent (step 2405).

However, in cases in which the person is not an approval authority non-owner, an error message indicating unsuccessful user authentication is sent back to the client PC2 from which the user ID has been sent (step 2406).

Figure 25:
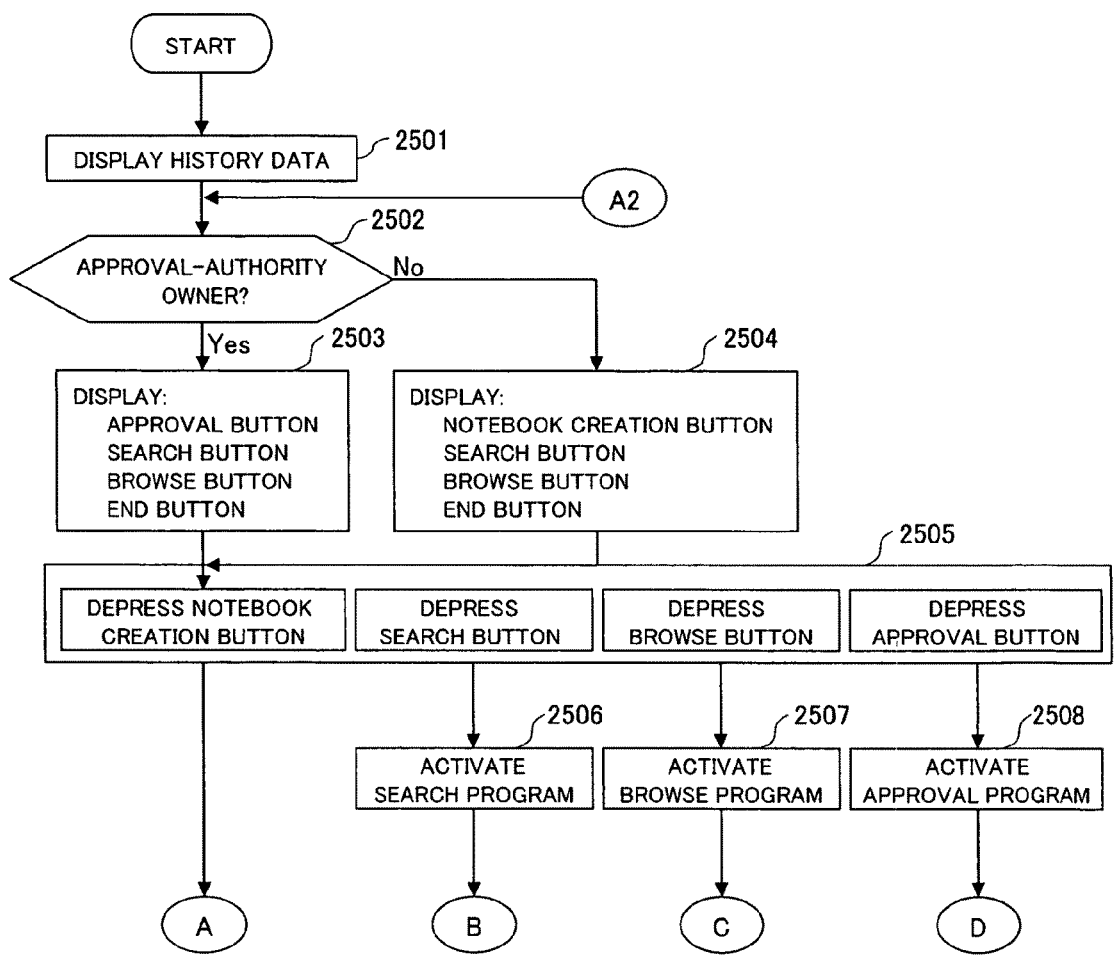
FIG. 25 shows a flowchart of the processing performed by an experiment record creation/registration program in the client PC2 and the approver PC3.
Figure 26:
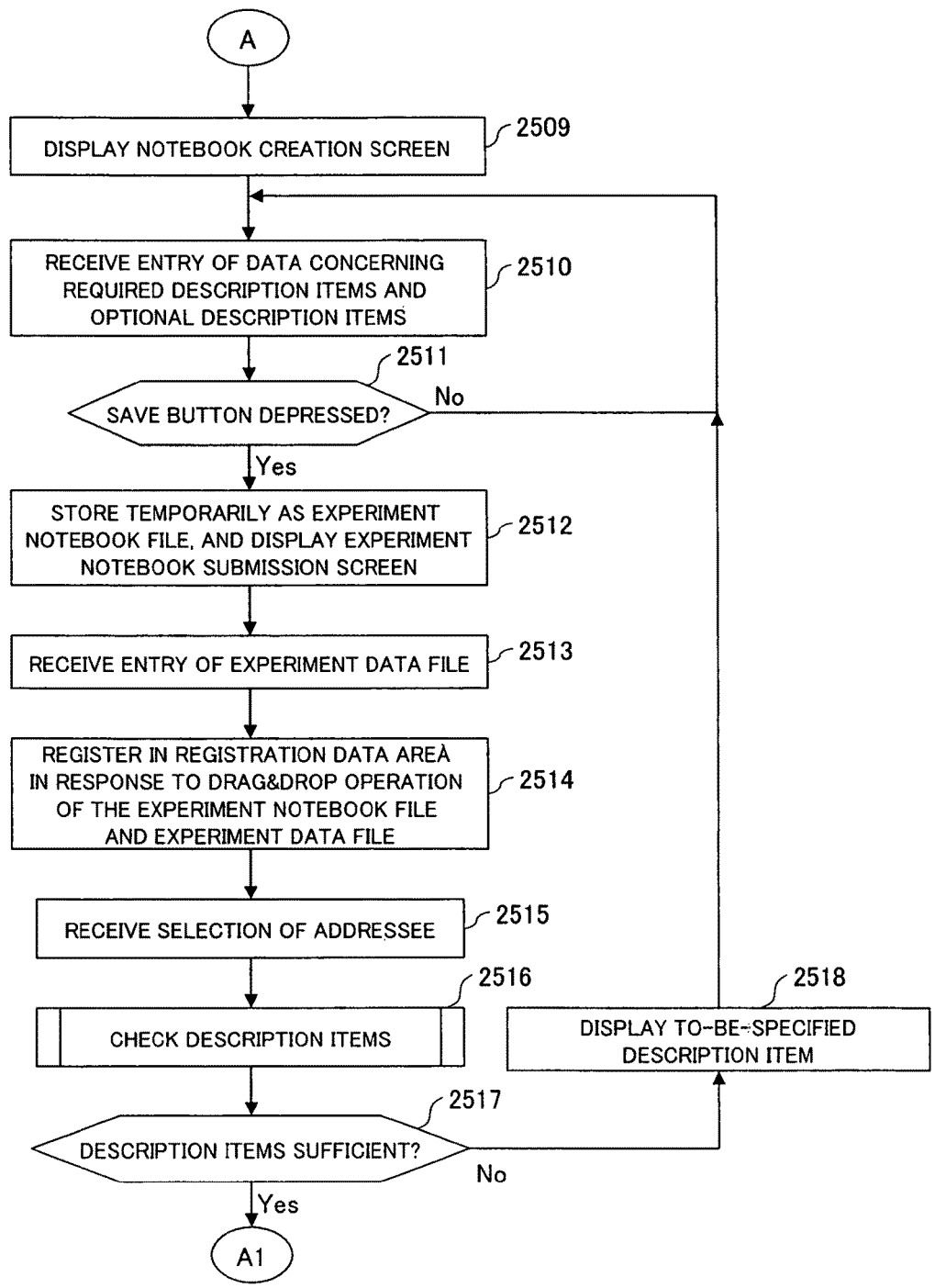
FIG. 26 shows a flowchart continued from FIG. 25.
Figure 27:
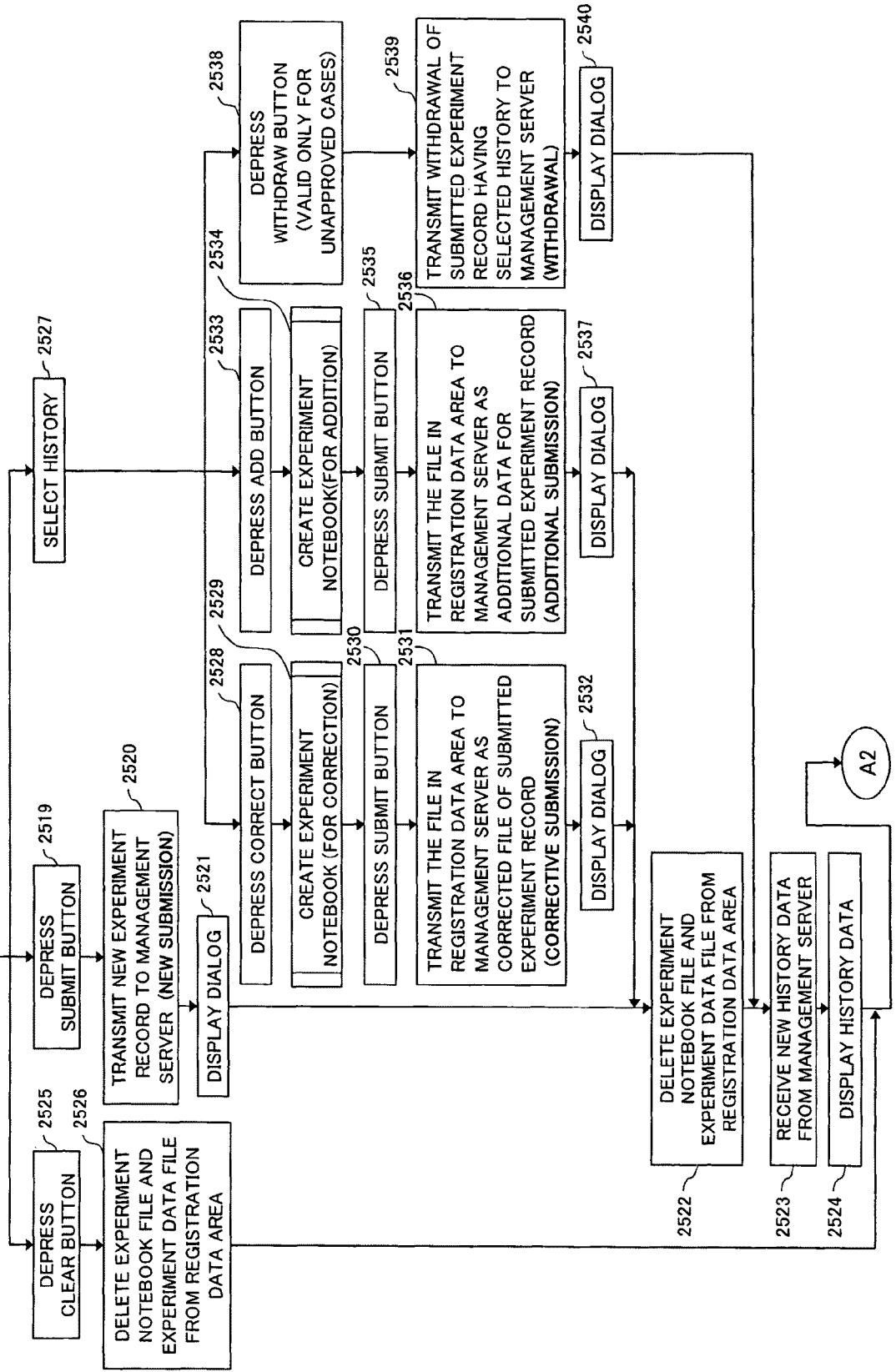
FIG. 27 shows a flowchart continued from FIG. 26.

FIGS. 25 to 27 show flowcharts of the processing performed by the experiment-record creation/registration program 233 in the client PC2 and the approver PC3.

First, when the experiment-record creation/registration program 233 is activated by the user authentication program 232, it displays the history data passed from the user authentication program 232 on the history display screen G02 of FIG. 8 (step 2501). Next, based on the message indicating successful user authentication passed from the user authentication program 232, it determines whether or not the person is an approval authority owner (step 2502).

If the person is an approval authority owner, on the history display screen G02, (1) "Approve" button B08, (2) "Search" button B06, (3) "Browse" button B05, and (4) "End" button B07 are displayed. In addition, in the history window W01, the "Display Details" button B09, "Approve" button B10, and "Reject" button B11 are displayed (step 2503).

However, if the person is an approval authority non-owner, in the history display screen G02, (1) "Create Notebook" button B04, (2) "Search" button B06, (3) "Browse" button B05, and (4) "End" button B07 are displayed. In addition, in the history window W01, the "Correct" button B11, "Withdraw" button B02, and "Add" button B03 are displayed (step 2504).

After this, processing is performed in accordance with the "Create Notebook" button B04, "Search" button B06, "Browse" button B06, or "Approve" button B08 that has been depressed (step 2505).

When the "Create Notebook" button B04 is depressed, the notebook-creation screen G03 exemplified in FIG. 11 is displayed (FIG. 26, step 2509), and in the notebook-creation screen G03, data entry such as required description items and optional description items is received from the input unit 22 (step 2510).

Next, whether or not the "Save" button B12 is depressed is determined (step 2511). If it is determined that the button has been depressed, the data entered is temporarily stored as an experiment notebook file, and the experiment notebook submission screen G04 of FIG. 12 is then displayed (step 2512).

Next, on the experiment notebook submission screen G04, the input of experiment data file is received from the experiment measurement apparatus 8 via a network or a recording medium (step 2513), and the experiment notebook file and experiment data file are dragged and dropped so that they are registered in the registration data window W02 (step 2514).

After this, a submission destination of the experiment notebook data to the approver is received (step 2515), and the description item check processing is performed (step 2516).

Based on the description item check processing, it is determined whether or not the description requirements are satisfied (step 2517). If there is an omission of required description items, a message indicating that there is an omission in description item is displayed in a dialog box 1601 as shown in FIG. 16 (step 2518), and the process returns to the step 2510 so as to allow recreation.

However, when it is determined that all the required description items are entered, the processing is made in a standby mode until the "Submit" button B14 is depressed. When the button is depressed (FIG. 27, step 2519), the data is sent to the management server 1 as new experiment notebook data (step 2520).

And, a dialog box 1401 indicating the completion of the transmission is displayed as exemplified in FIG. 14 (step 2521).

Next, the experiment notebook file and experiment data file in the registration data area window W02 are deleted (step 2522), new history data according to the new submission processing is received from the management server 1 (step 2523), and the history data is then displayed (step 2524).

With the display of such history data, the submitter of the experiment notebook data can confirm that the experiment notebook data submitted by him/herself has been submitted to the management server 1 without fail.

When the "Clear" button B15 is depressed after the experiment notebook file and experiment data file are registered in the registration data window W02 (FIG. 27, step 2525), the experiment notebook file and the experiment data file in the registration data window W02 are deleted (step 2526).

When one of the previously-submitted experiment notebook data is selected with the mouse cursor (FIG. 27, step 2527) and the "Correct" button B01 is depressed (step 2528) on the history display screen G02 of FIG. 8, in order to create a corrected version of experiment notebook data, the experiment notebook creation screen G03 is displayed, and a corrected version of experiment notebook data is created (step 2529). This creation processing is the same as the processing of FIG. 26.

When the creation of a corrected version of experiment notebook data is completed and the "Submit" button B14 is depressed (step 2530), the experiment notebook data file and the experiment data file in the registration data window W02 are sent to the management server 1 as a corrected file of a submitted experiment record (step 2531).

After this, a dialog box indicating the completion of the transmission is displayed (step 2532), the experiment notebook file and the experiment data file in the registration data window W02 are deleted (step 2522), new history data relating to the new submission processing is received from the management server 1 (step 2524), and the history data is displayed (step 2524).

Further, when one of the previously-submitted experiment notebook data is selected with a mouse cursor on the history display screen G02 of FIG. 8 (step 2527) and the "Add" button B03 is depressed (step 2534), in order to create additional experiment notebook data, the experiment notebook creation screen G03 is displayed, and the additional experiment notebook data is created (step 2534). This creation processing is the same as the processing of FIG. 26.

When the creation of such additional experiment notebook data is completed and the "Submit" button B14 is depressed (step 2535), the experiment notebook data file and the experiment data file in the registration data window W02 are sent to the management server 1 as a file added to the submitted experiment record (step 2536).

Next, a dialog box indicating the completion of the transmission is displayed (step 2538), the experiment notebook file and the experiment data file in the registration data window W02 are deleted (step 2522), new history data relating to the new submission processing is received from the management server 1 (step 2523), and the history data is displayed (step 2524).

When one of the previously-submitted, unapproved experiment notebook data is selected with a mouse cursor on the history display screen G02 of FIG. 8 (step 2527) and the "Withdraw" button B02 is depressed (step 2538), a notice indicating the withdrawal of the selected submitted experiment record in the history is sent to the management server 1 (step 2539), and a dialog box indicating the completion of the transmission is displayed (step 2541). Next, new history data relating to the notice of withdrawal is received from the management server 1 (step 2523), and the history data is displayed (step 2524).

Figure 28:
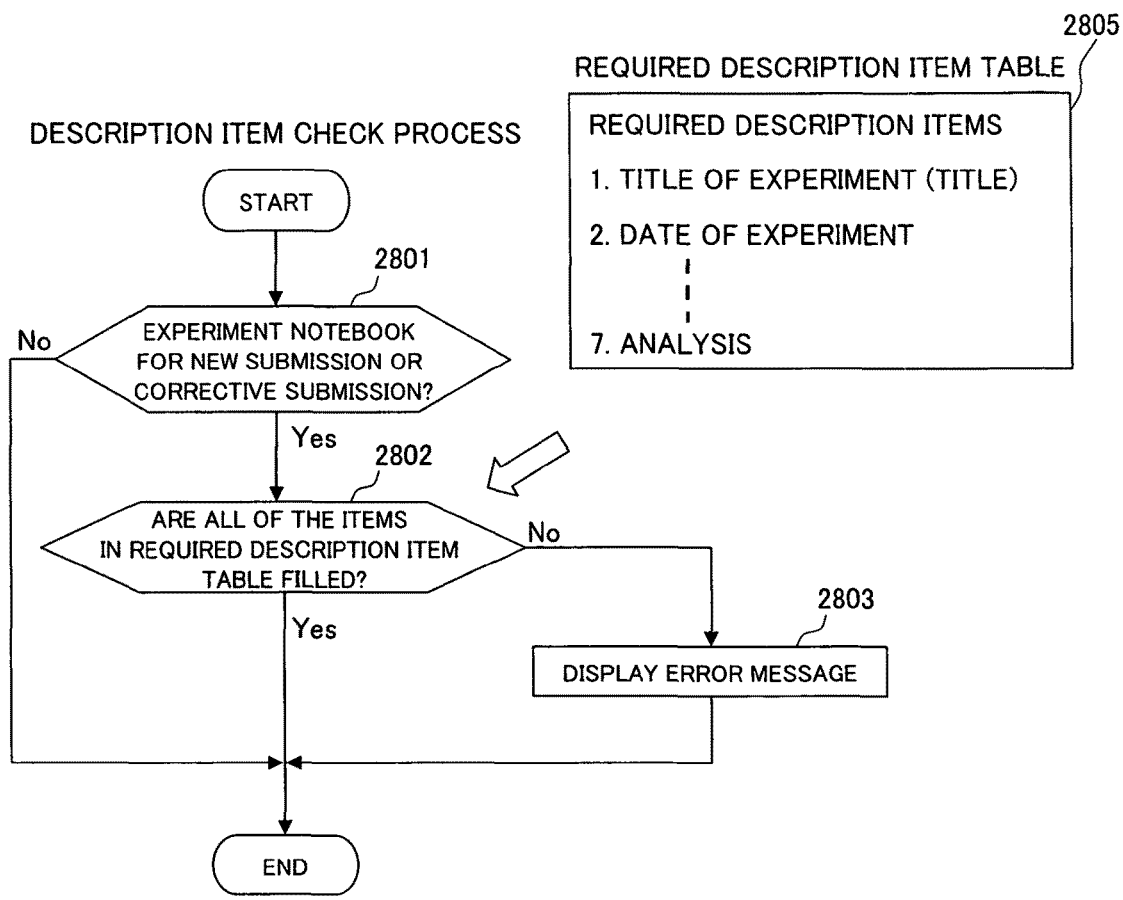
FIG. 28 shows a flowchart of the details of the description item check processing.

FIG. 28 shows a flowchart of the details of the description item check processing at the step 2516 in FIG. 26.

In the description item check processing, first, whether the experiment notebook is newly submitted or is submitted after correction is determined (step 2801). When it is determined that the experiment notebook has been newly submitted or submitted after correction, whether all the description items set in a required description item table 2805 are entered is checked (step 2802). If not, an error message as shown in FIG. 16 is displayed (step 2803). Otherwise, the step proceeds to END.

Figure 29:
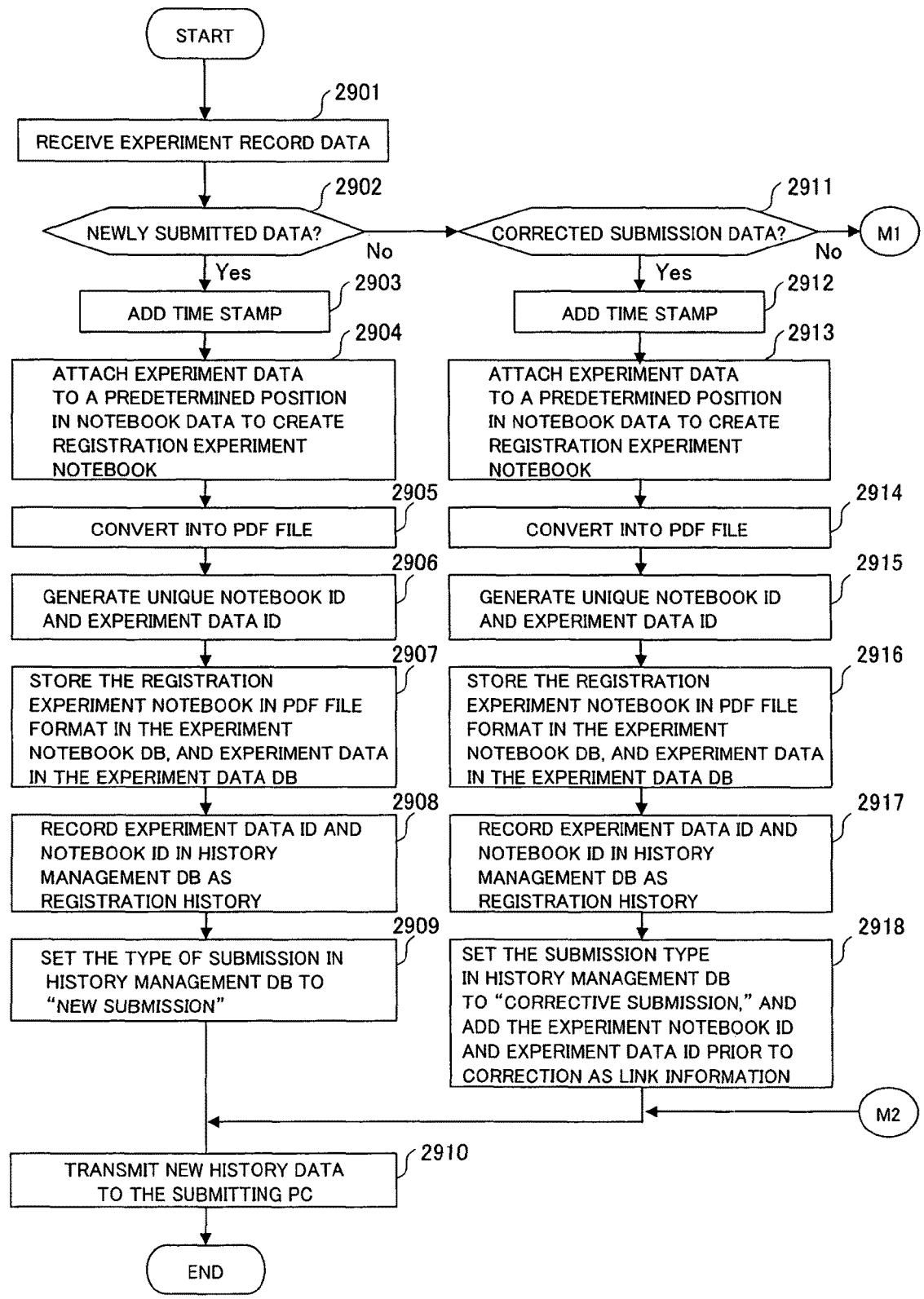
FIG. 29 shows a flowchart of the processing performed when an experiment record management program of the management server receives experiment notebook submission data.
Figure 30:
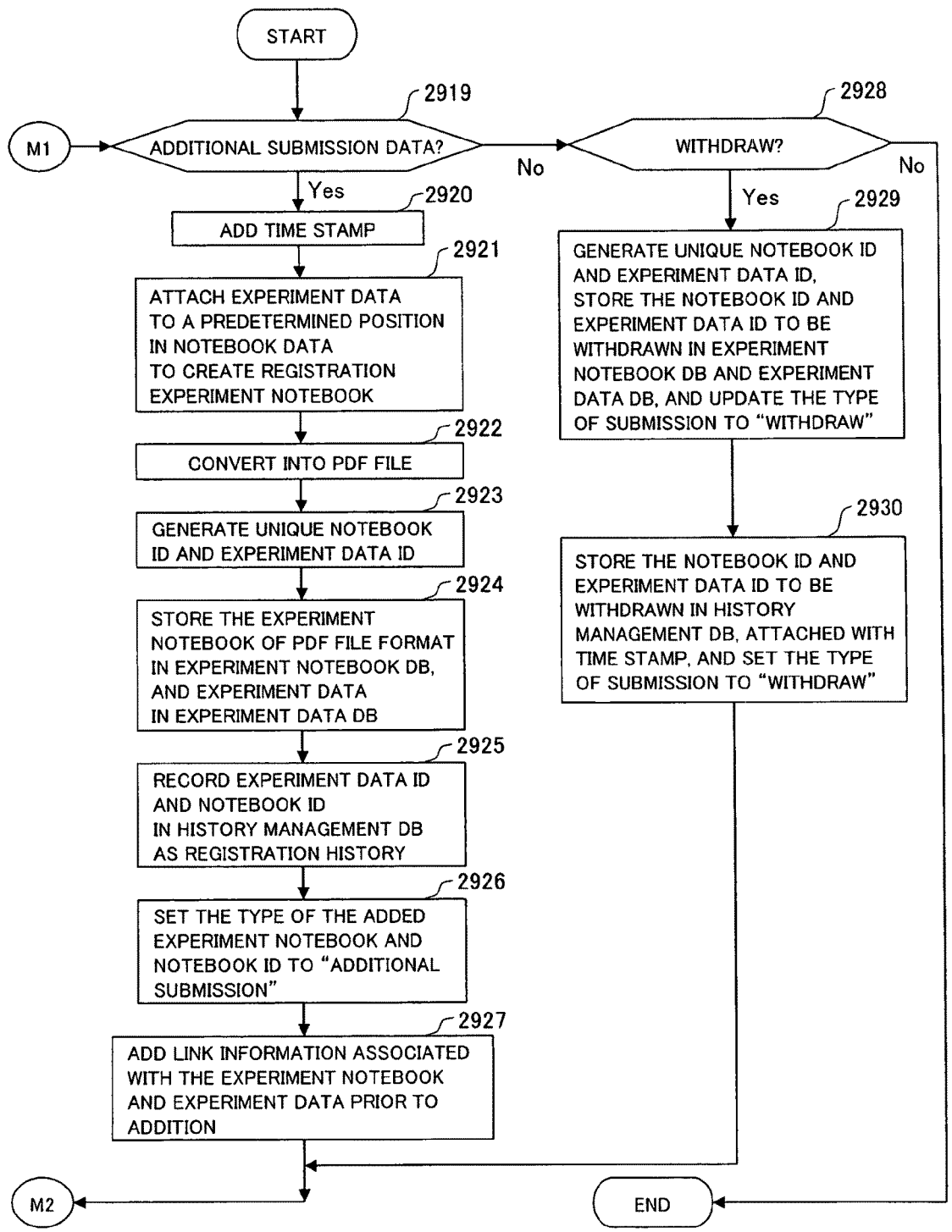
FIG. 30 shows a flowchart continued from FIG. 29.

FIGS. 29 and 30 show flowcharts of the processing performed when the experiment-record management program 143 in the management server 1 receives experiment notebook submission data.

When the experiment-record management program 143 receives experiment record data including experiment notebook data and experiment data or when it receives a notice of withdrawal from the client PC2 (step 2901), it determines whether or not the received data is newly submitted data, data submitted after correction, data submitted after addition, or a notice of withdrawal (steps 2902, 2912, 2920, 2924).

Whether the data is newly submitted data, data submitted after correction, or data submitted after addition is determined based on a message indicating a submission type added to the experiment notebook data when the experiment notebook is submitted. Whether or not the data is a notice of withdrawal is determined based on a message indicating a notice of withdrawal added to the received data from the client PC2.

When the data is newly-submitted data (step 2902), a time stamp is added (step 2903), experiment data is attached to a predetermined position of the experiment notebook data so as to create an integrally-edited registration experiment notebook (step 2904). The data is then converted into PDF file to which access is allowed for reference purposes only (step 2905), and next, a notebook ID and an experiment data ID unique to the PDF file are generated (step 2906). A registration experiment notebook in PDF file format is associated with the notebook ID and is then stored in the experiment notebook DB5, and the experiment data is associated with the experiment data ID and is then stored in the experiment data DB6 (step 2907).

Next, a history ID unique to the experiment data and the registration experiment notebook is generated, the newly-submitted experiment notebook data, experiment-data notebook ID, experiment data ID are recorded in the history management DB7 as the new registration history of the experiment data and the registration experiment notebook (step 2908), and the submission type of the history management DB7 is set to be "Newly Submitted" (step 2909).

Next, an updated new history data of the history management DB7 is sent to the client PC2 from which the submission has been made (step 2910).

FIG. 31 shows a structure of experiment notebook data and comment data stored in the experiment notebook DB5. The experiment notebook data in PDF file format is provided with a unique notebook ID generated for each item of the experiment notebook data, and a time stamp indicating the time of receipt by the management server 1 is also added. The data is then stored. The experiment notebook data in PDF file format is managed based on the notebook ID, and the relationship with the comment data or the experiment data is associated by the notebook ID.

The experiment notebook data of each notebook ID is also provided with a submission type, an approver, a status, an update history, and a comment data ID.

The submission type indicates new submission, submission after correction, submission after addition, withdrawal, submission of a decision of approval, or submission of a decision of rejection.

The approver means the approver selected as a submission destination on the experiment notebook submission screen G04. Note that when multiple approvers are present, multiple approvers' names are recorded.

The status is for identifying whether the experiment notebook data has been approved by the approver or has been withdrawn by the submitter him/herself. Such status as new approval, approval of correction, approval of addition, or withdrawal is recorded depending on new submission, submission after correction, submission after addition, or withdrawal.

The update history indicates the experiment notebook data before correction or addition, when submission after correction or submission after addition is made.

The comment data ID shows the ID of comment data entered when the approver makes a decision of approval or a decision of rejection.

The comment data is provided with a unique comment ID) generated for each of the comment data, and each of the comment data is also provided with a time stamp indicating the time of receipt by the management server 1. The comment data is then stored.

FIG. 32 shows a structure of experiment data stored in the experiment data DB6. The experiment data is provided with a unique experiment data ID generated for each of the experiment data, and each of the experiment data is provided with a time stamp indicating the time of receipt by the management server 1. The experiment data is then stored. The experiment data is managed based on the experiment data ID, and the relationship with the experiment notebook data is associated by the notebook ID.

The experiment data of each experiment data ID is further provided with a submission type, an approver, a status, an update history, and a notebook ID.

The submission type, the approver, the status, and the update history are the same as those of the experiment notebook data.

The notebook ID is the notebook ID of an experiment notebook data paired with a relevant experiment data.

The experiment data and the comment data are integrally associated with the experiment notebook data by the notebook ID.

Since the data is associated by the notebook ID, even when different experimenters submit experiment notebook data or experiment data having the same file name, the management can be carried out without causing confusion.

When the management server 1 receives a notice of withdrawal of previously-submitted experiment notebook data in PDF file format, such a notebook ID is also generated for the notice of withdrawal, the notebook ID in PDF file format to be withdrawn is recorded, and a time stamp is added.

FIG. 33 shows a structure of history management data stored in the history management DB7. The experiment-record management program 143 of the management server 1 generates a unique history ID every time it receives a new submission, corrective submission, additional submission, request for withdrawal, decision of approval, decision of rejection, or notice of withdrawal of experiment notebook data from the client PC2 or the approver PC3. Each item of the received data is provided with a unique history ID and time stamp, and the notebook ID is stored.

At the same time, the submission type, the executor, the status, the project name, the experimenter, the start page, and the end page are recorded.

The submission type and the status are the same as those of the experiment notebook data.

The project name is the project name described in the experiment notebook data and extracted from the experiment notebook data prior to the conversion thereof into PDF file format.

The experimenter indicates the experimenter who has sent the received data, and it is extracted from the experiment notebook data prior to the conversion thereof into PDF file format.

The start page and the end page are the start page and the end page of the experiment notebook data, and they are extracted from the experiment notebook data prior to the conversion thereof into PDF file format.

The status of each item of the experiment notebook data in the history management DB7 is updated to "New Approval," "Approval of Correction," or "Approval of Addition," upon receiving data concerning a decision of approval or a decision of rejection from the approver. The status of the experiment notebook data withdrawn is updated to "Withdrawn."

Any one of the "New Approval," "Approval of Correction," "Approval of Addition," and "Withdrawn" is not recorded in the status of unapproved experiment notebook data.

Further, when it is determined that the received data is not newly-submitted data in the step 2902 of FIG. 29, whether or not the received data is data submitted after correction is determined (step 2911).

When the received data is determined to be data submitted after correction, the data submitted after correction is provided with a time stamp (step 2912), and experiment data is attached to a predetermined position of the experiment notebook data submitted after correction so as to create an integrally-edited registration experiment notebook (step 2913). The data is then converted into PDF file to which access is allowed for reference purposes only (step 2914), and a unique notebook ID and experiment data ID are generated for the PDF file (step 2915). Next, the registration experiment notebook in PDF file format is associated with the notebook ID and is then stored in the experiment notebook DB5. The experiment data is associated with the experiment data ID and is then stored in the experiment data DB6 (step 2916).

Next, a unique history ID is generated for the experiment data and the registration experiment notebook. The experiment notebook data submitted after correction, the notebook ID of the experiment data, and the experiment data ID are recorded in the history management DB7 as the registration history of the experiment data and the correction of the registration experiment notebook (step 2917). The submission type of the history management DB7 is set to be "Submitted after Correction" and the update history of the history management DB7 is provided with a notebook ID of the experiment notebook data prior to correction as link information (step 2918).

Next, new history data is sent to the client PC2 from which the submission has been made (step 2910).

Further, when the received data is data submitted after addition (step 2919), a time stamp is added thereto (step 2920), and experiment data is attached to a predetermined position of the experiment notebook data submitted after addition so as to create an integrally-edited registration experiment notebook (step 2921). The data is then converted into PDF file to which access is allowed for reference purposes only (step 2922), and a unique file ID is generated for the PDF file (step 2923). The registration experiment notebook in PDF file format is stored in the experiment notebook DB5, and the experiment data is stored in the experiment data DB6 (step 2924).

Next, a unique history ID is generated for the experiment data and the registration experiment notebook, and the experiment notebook data submitted after addition, a notebook ID of the experiment data, and an experiment data ID are recorded as the registration history of addition (step 2925). The submission type of the history management DB7 is set to be "Submitted after Addition" (step 2926), and the update history of the history management DB7 is provided with the notebook ID of the experiment notebook data prior to addition as link information (step 2927).

Next, new history data is sent to the client PC2 from which the submission has been made (step 2928).

Further, when the received data is a notice of withdrawal (step 2928), a unique notebook ID and experiment data ID are generated for the notice of withdrawal. The notebook ID and the experiment data ID to be withdrawn are stored in the experiment notebook DB5 and the experiment data DB6. They are provided with a time stamp, the submission type is set to be "Withdrawn," and the status of the experiment notebook data to be withdrawn is updated to "Withdrawn" (step 2929). Further, the notebook ID and the experiment data ID to be withdrawn are similarly stored in the history management DB7, a time stamp is added, and the submission type is set to be "Withdrawn" (step 2930).

Next, the processing performed by the experiment record approval program 236 of the approver PC3 used by the approver will be described with reference to the flowchart of FIG. 34.

The experiment record approval program 236 is activated when the "Approve" button B08 is depressed in a state in which the history display screen G02 of FIG. 9 is displayed.

First, in order to obtain a latest list of unapproved cases from the management server 1, the experiment record approval program 236 sends a request for the unapproved case list to the management server 1 (step 3401).

Upon receiving the updated list of unapproved cases from the management server 1, the unapproved case list display screen G09 exemplified in FIG. 21 is displayed (step 3402).

The "Display Details" button B09, the "Approve" button B10," and the "Reject" button B11 are displayed below this unapproved case list.

When the approver selects any one of the experiment notebook data in the unapproved list with a mouse cursor, the selection operation is accepted (step 3403). When the "Display Details" button B09 is depressed (step 3404), in order to obtain the selected experiment notebook data from the management server 1, the experiment record approval program 236 requests to send back detailed data (step 3405).

When the approver receives the selected experiment notebook data from the management server 1 (step 3406), the experiment notebook data is displayed on the unapproved case detail display screen G10 as exemplified in FIG. 22 (step 3407). In this case, the received data is provided with a notebook ID.

The comment entry field 2201 is displayed on the unapproved case detail display screen G10, and the "Approve" button B10 and the "Reject" button B11 are also displayed.

The approver checks the experiment notebook data displayed in detail and determines whether a decision of approval or a decision of rejection should be made. In accordance with the decision, the approver enters his/her comments in the comment entry field 2201 with the input unit 22. When the experiment record approval program 236 receives input of the comment (step 3408) and the "Approve" button B10 or the "Reject" button B11 is depressed (steps 3409, 3411), in accordance with the decision, it sends a message indicating a decision of approval or a decision of rejection and the comment data to the management server 1 (steps 3410, 3412).

In this case, in order to identify which experiment notebook data the decision of approval or the decision of rejection has been made upon, a notebook ID is added and sent.

When the "Return" button B13 is depressed, the screen returns to the unapproved case list screen G09 of FIG. 21. When the "Return" button B13 is not depressed, the step returns to the step 3401 so that the processing for the next unapproved case can be performed (step 3413).

Figure 35:
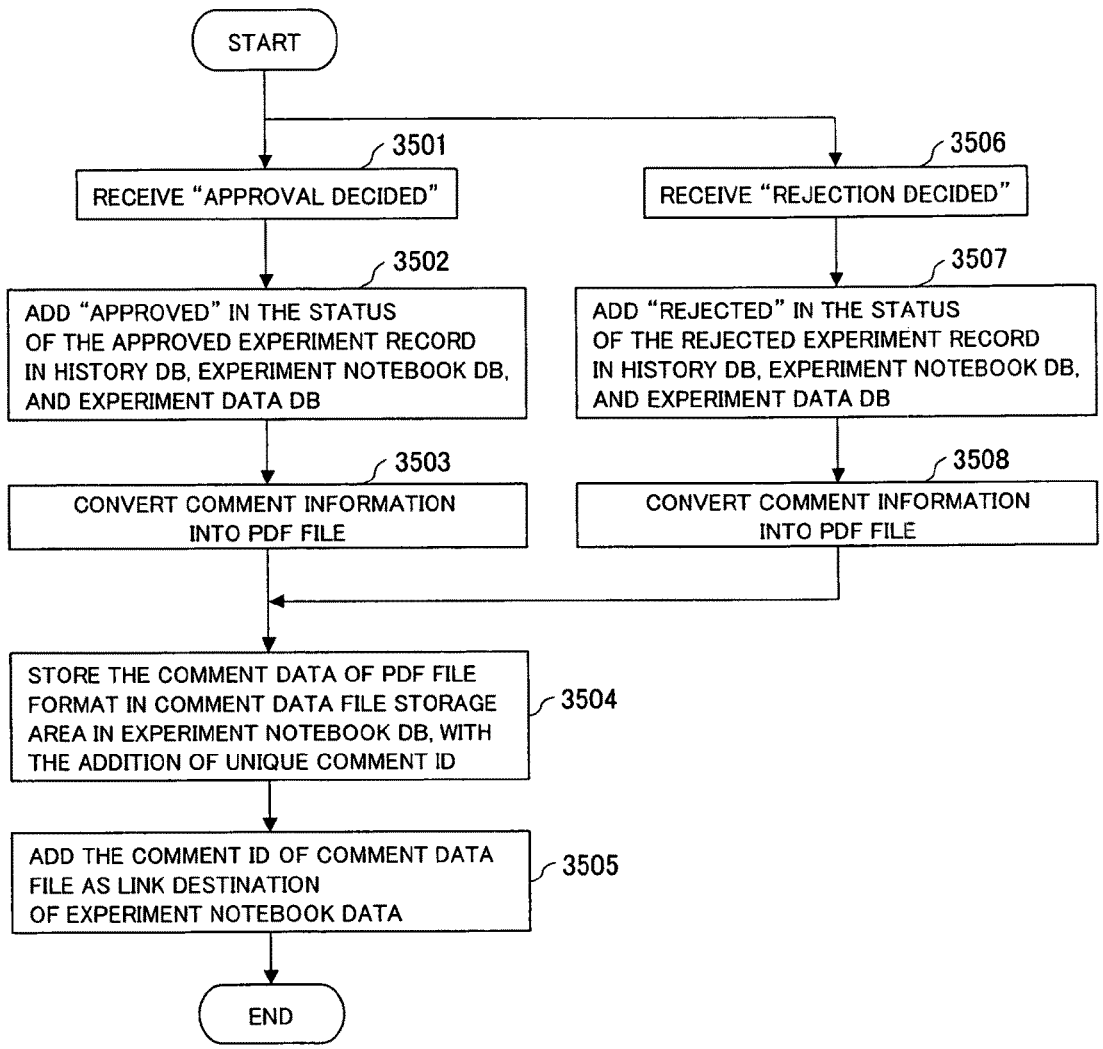
FIG. 35 shows a flowchart of the processing performed by the experiment record management program of the management server that has received information concerning a decision of approval or a decision of rejection.

FIG. 35 shows a flowchart of the processing performed by the experiment-record management program 143 of the management server 1 that has received information concerning a decision of approval or a decision of rejection.

When the experiment-record management program 143 of the management server 1 receives information concerning a decision of approval or a decision of rejection and comment data from the approver's client PC2 (step 3501, 3502), it updates the status of the relevant experiment notebook data stored in the experiment notebook DB5, experiment data DB6, and history management DB to be "Rejected" or "Approved," and the status of the history management DB7 is updated in the same manner (step 3502, 3507).

Next, the comment data is converted into PDF file (step 3503, 3508), and the comment data in PDF file format is provided with a unique comment ID and is then stored in a comment data storage area of the experiment notebook DB5 (step 3504).

Next, the comment ID of the comment data file is added as a link destination of the experiment notebook data (step 3505).

Next, the processing of the experiment-record search program 235 and the experiment-record browse program 234 commonly used by both the experimenter and the approver will be described.

Figure 36:
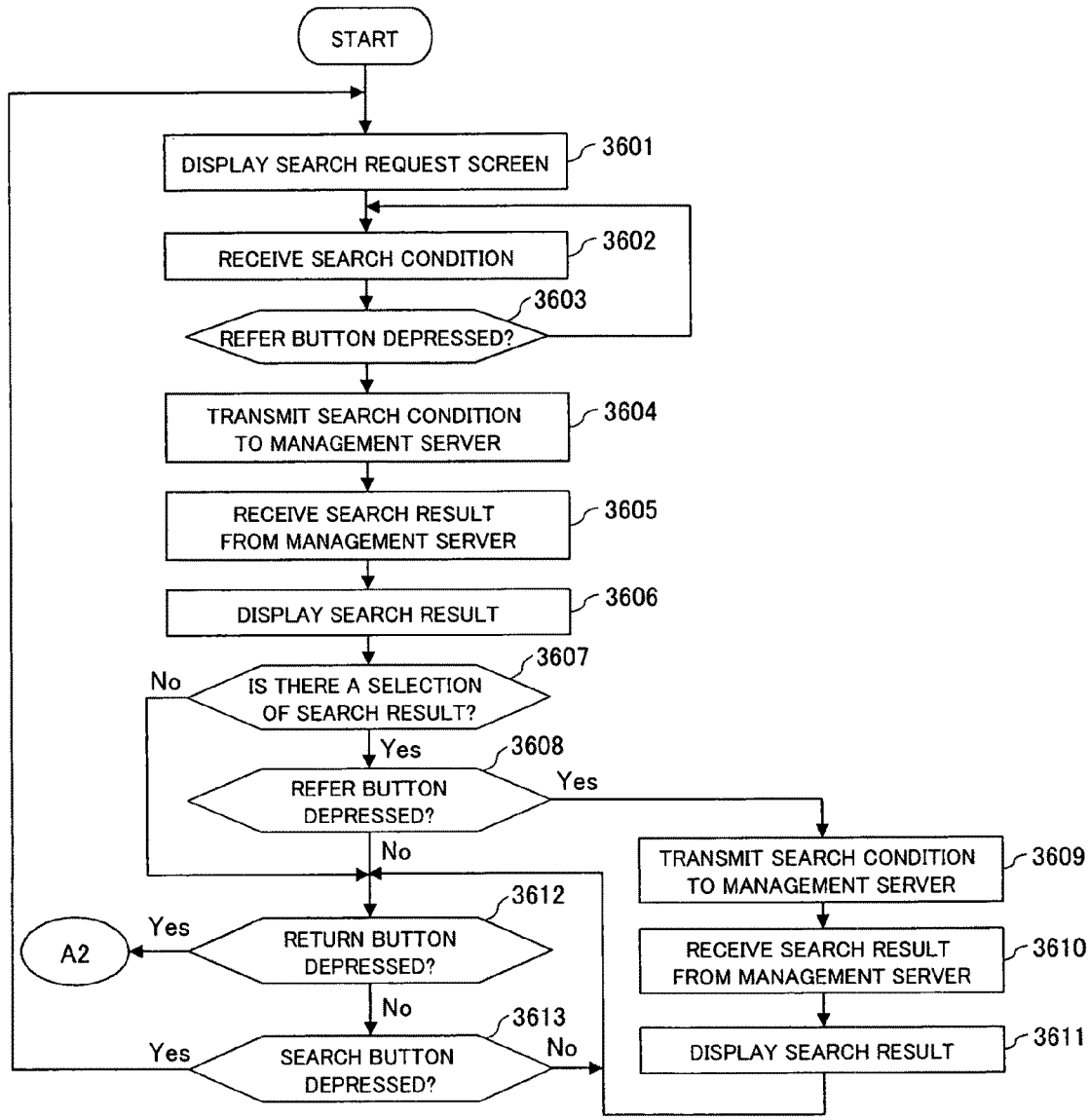
FIG. 36 shows a flowchart of the processing performed by an experiment record search program.
Figure 37:
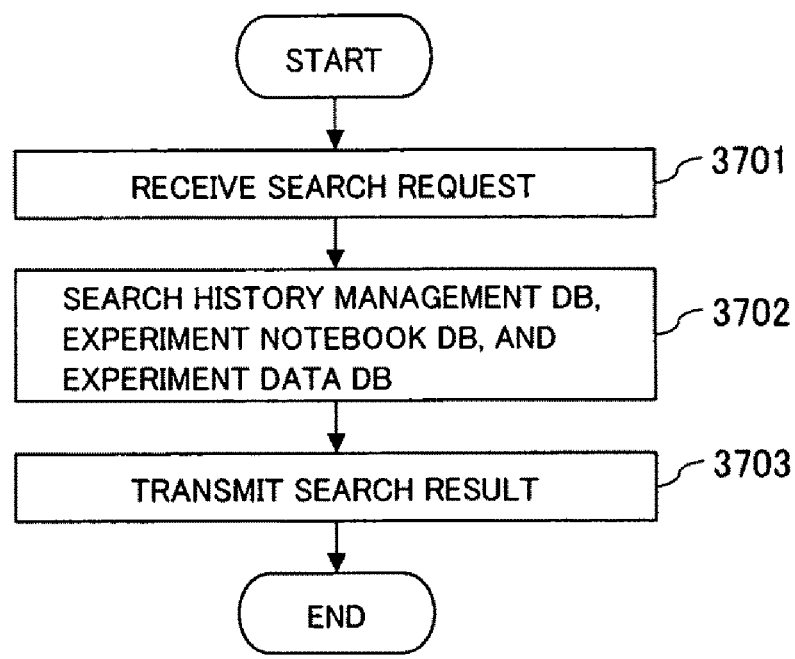
FIG. 37 shows a flowchart of the processing performed by the experiment record management program when a search request is received.

FIG. 36 shows a flowchart of the processing performed by the experiment-record search program 235, and FIG. 37 shows a flowchart of the processing performed by the experiment-record management program 143 when a search request has been received.

First, when the "Search" button B06 is depressed on the history display screen G02 of FIG. 8, the experiment-record search program 235 is activated, and the screen changes to the search request screen G05. On this search request screen G05, as exemplified in FIG. 19, the browse condition designation area 1901 including the dates, the project name, the experimenter, and the pages concerning the experiment notebook data to be searched for is displayed (step 3601).

On the screen, when any search condition is entered with the input unit 22 (step 3602), and the "Refer" button B16 is depressed (step 3603), a search request having the entered search condition is sent to the management server 1 (step 3604).

When the management server 1 receives the search condition (step 3701), it searches the experiment notebook DB5, the experiment data DB6, and the history management DB7 for the experiment notebook data or the experiment data satisfying the received search condition (step 3702), and the search result is sent to the client PC2 from which the search request has been sent (step 3703).

When the experiment-record search program 235 of the client PC2 from which the search request has been sent receives the search result (step 3605), it displays the experiment notebook data or the experiment data corresponding to the received search result on the search result display screen G06 (step 3606).

FIG. 20 shows an example of the search result display screen G06. In this example, a list of experiment notebook data corresponding to such a search condition is displayed in order by date.

When any one of the data in the list is selected with a mouse cursor (step 3607) and the "Refer" button B16 is depressed again (step 3608), the experiment-record search program 235 sends a reference request having the selected search result as a new search condition to the management server 1 (step 3609).

When the search result has been received (step 3610), the search result is displayed on the search result screen G06.

When the "Return" button B13 on the search result display screen G06 is depressed (step 3612), the screen changes to the history display screen G02 of FIG. 8. When the "Search" button B06 is depressed, the flow returns to the step 3601, and the screen changes to the search request screen G06 of FIG. 19 (step 3613).

Figure 38:
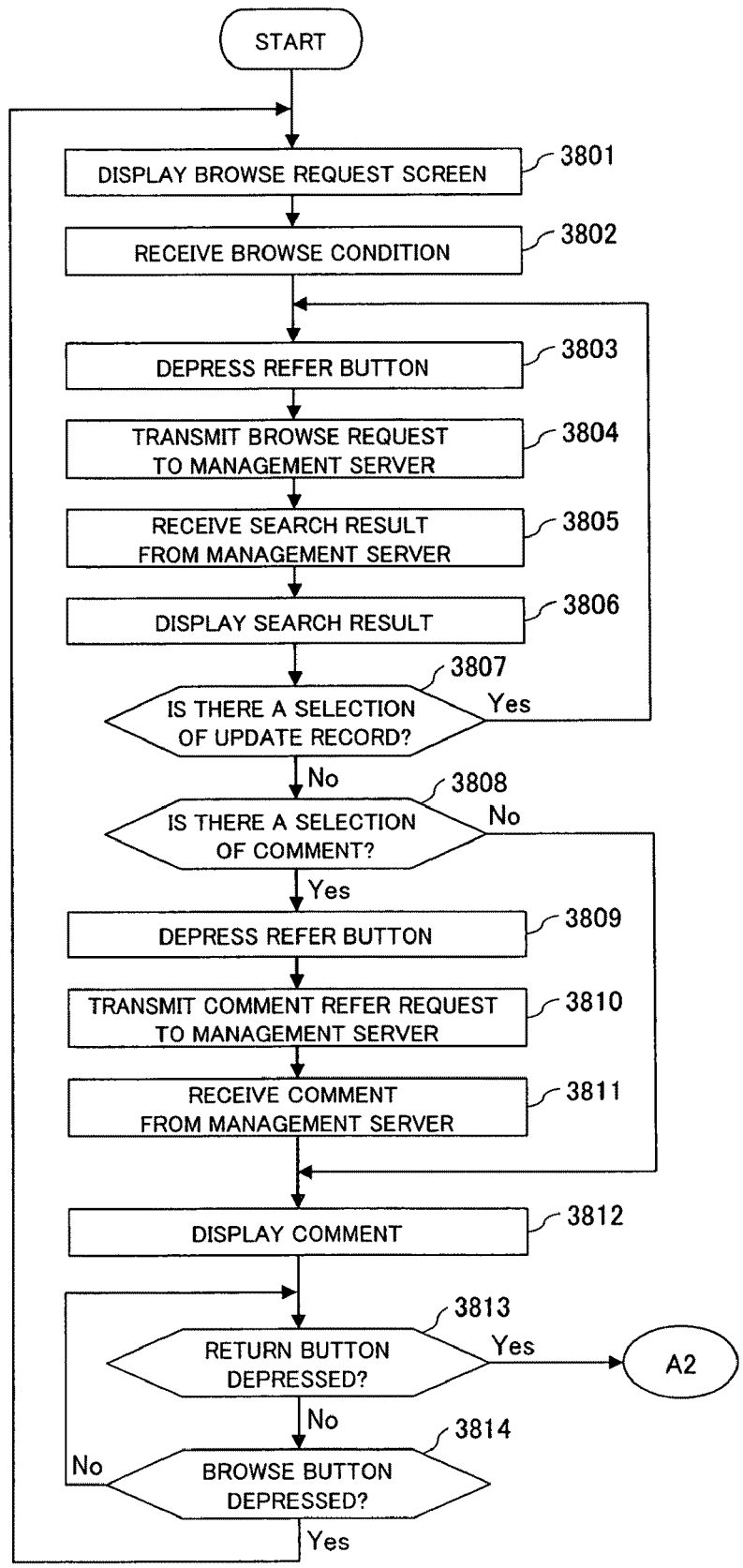
FIG. 38 shows a flowchart of the processing performed by an experiment record browse program.
Figure 39:
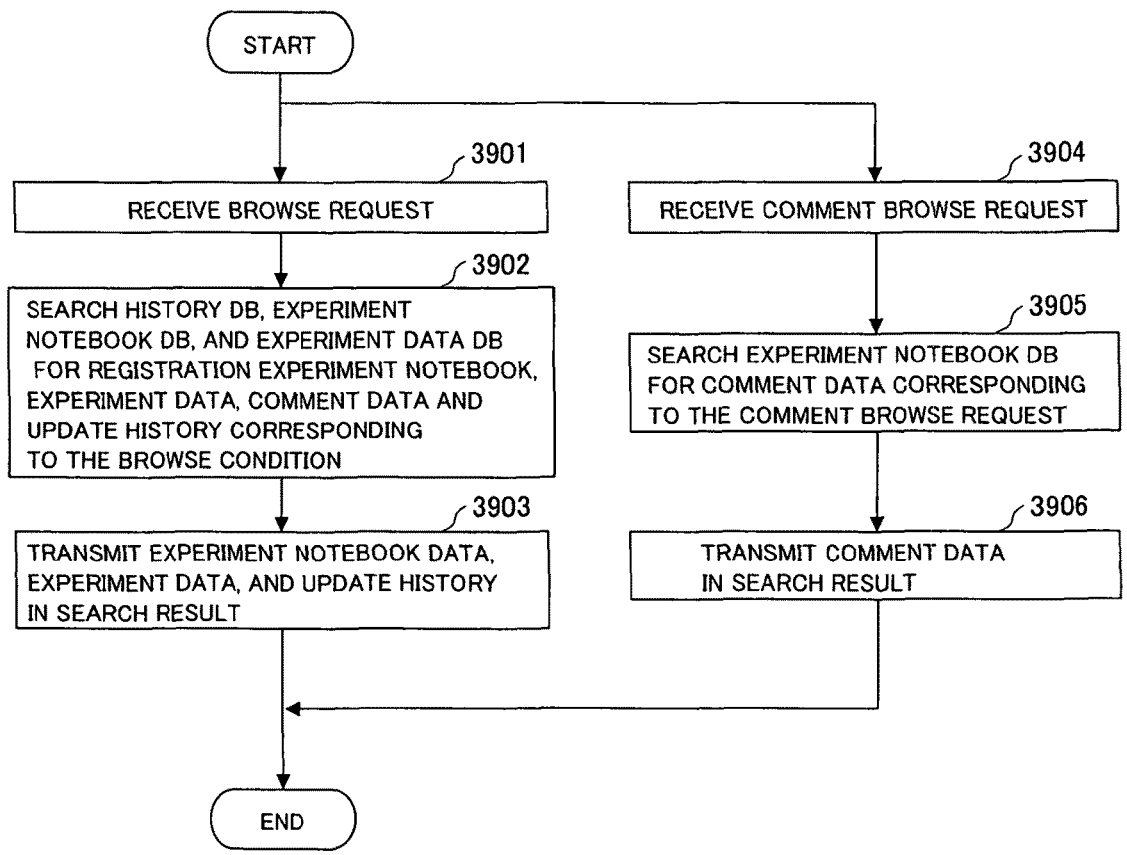
FIG. 39 shows a flowchart of the processing performed by the experiment record management program when a browse request is received.

FIG. 38 shows a flowchart of the processing performed by the experiment record browse program 234, and FIG. 39 shows a flowchart of the processing performed by the experiment-record management program 143 when a browse request has been received.

First, when the "Browse" button B05 is depressed on the history display screen G02 of FIG. 8, the experiment record browse program 234 is activated and the browse request screen G07 is then displayed (step 3801). On the browse request screen G07, as exemplified in FIG. 17, the browse condition designation area 1701 including the year, the project name, the experimenter, the page, and the like concerning the experiment notebook data to be browsed is displayed.

In the area, when any browse condition is entered with the input unit 22, the condition is accepted (step 3802). Next, when the "Refer" button B16 is depressed (step 3803), the experiment record browse program 234 sends a browse request having the entered browse condition to the management server 1 (step 3804).

When the management server 1 receives the browse request (step 3901), it searches the experiment notebook DB5, the experiment data DB6, the history management DB7 for the experiment notebook data or the experiment data corresponding to the received browse condition (step 3902), and it sends, as a result of the search, the experiment notebook data, the experiment data, and the update history to the client PC2 from which the browse request has been sent (step 3903).

The experiment record browse program 234 of the client PC2 from which the browse request has been sent displays, as the received search result, the experiment notebook data, the experiment data, and the update history on the browse screen G08 (step 3805, 3806).

FIG. 18 shows an example of the browse screen G08. In this example, the experiment notebook data in PDF file format is displayed in the middle of the screen. On the right side of the screen, there are displayed the summary information concerning the experiment notebook data, link information to the experiment data, the dates on which the approver made his/her comments, the dates of the update history concerning the experiment notebook data (concerning submission after addition, submission after correction, and the like).

When any one of the data in the update history is selected (step 3807) and the "Refer" button B16 is depressed, a browse request indicating that the selected update history is to be used as one browse condition is sent, and the result is then displayed (step 3804, 3805, 3806).

When one of the dates of the comments is selected (step 3808) and the "Refer" button B16 is depressed (step 3809), a relevant reference request is sent to the management server 1 (step 3810), the comment contents are received from the management server 1 (step 3811), and the contents are displayed on the browse screen (step 3812).

When the "Return" button B13 on the browse screen G08 is depressed (step 3813), the screen changes to the history display screen G02 of FIG. 8. When the "Browse" button B05 is depressed, the flow returns to the step 3801, and the screen changes to the browse request screen G07 of FIG. 17.

When the experiment-record management program 143 of the management server 1 receives the comment browse request (step 3904), it searches the experiment notebook DB for the comment data having the date corresponding to the comment browse request (step 3905), and it then sends the search result to the client PC2 (step 3906).

As described above, in the present embodiment, when experiment notebook data is created, since there are provided: means for checking required description requirements; means for associating experiment notebook data with experiment data to integrally manage the data; means for searching for and browsing experiment notebook data and experiment data; and means for making a decision of approval or rejection, experiment notebooks satisfying the requirements required for experiment records can be easily computerized, and effective utilization of the computerized experiment notebooks or experiment data can be facilitated.

Further, as a description requirement, by checking at least one of the control number of the experiment apparatus, the usage time period of the apparatus, and the signature of the apparatus manager, the credibility of experiment data can be enhanced.

Furthermore, by integrally editing experiment notebook data and experiment data, converting the data into a file format to which access is allowed for reference purposes only, and storing the data in a database, falsification can be prevented, thereby improving reliability.

In addition, with a browse function and a search function, research products of other researchers can be referred to. Thus, when conceiving new ideas or writing a research paper or a report, it becomes possible to reduce the burden on researchers when writing a research paper or a report. As a result, the present invention can contribute to efficient utilization of research and development property.

Further, the computerization of experiment data eliminates the need of complicated and troublesome handling such as pasting a hardcopy of experiment data in an experiment notebook, thereby significantly reducing the burden on researchers.

Further, with the function of checking required description items, variation in the quality of experiment notebooks made by researchers can be suppressed.

While, in the above embodiment, the description items are displayed on the experiment notebook creation screen G03 and necessary information are entered in the entry fields thereon, the present invention is not limited to such embodiment.

For example, as shown in FIG. 40, when stamps 401 concerning the required description items and stamps 402 concerning the optional description items are displayed on the experiment notebook creation screen and the experiment notebook description items are entered in an edit window 403, necessary stamps may be moved into the edit window 403 so as to enter necessary information therein, as shown in FIG. 41.

In such case, when the stamps prepared as required description items are not moved into the edit window 403, it can be immediately determined that the required description items corresponding to the stamps have not been entered.

Furthermore, in the case of submission after addition, while description requirements are not checked, implementation of the check processing may be limited only to cases in which part of the description items is added.

What is claimed is:

1. A system for managing the property of research and development, comprising:

a computer individually used by each experimenter and experiment approver; and a management computer for managing an experiment notebook database, an experiment data database, and a history management database, wherein the computer used by each experimenter comprises:

first means for displaying an experiment notebook form in which predetermined description items are described and description fields are left in blank on a screen of a display unit and receiving description data with respect to the individual description items on the screen from an input means;

second means for checking, when an operation indicating the completion of description data entry is performed, whether all the description data in the description items satisfying required description requirements has been entered and temporarily storing the data as experiment notebook data in a storage means when all the data has been entered; and third means for sending the experiment notebook data and the experiment data corresponding to the experiment notebook data obtained via measurement apparatus to the management computer via a network in accordance with a registration operation by the experimenter, wherein the management computer comprises:

fourth means for receiving the experiment notebook data and the experiment data from the experimenter's computer, integrally editing the experiment data with the experiment notebook data, converting the data into experiment notebook data in a file format to which access is allowed for reference purposes only, providing the data with a time stamp, and then storing the data in the experiment notebook database;

fifth means for providing the experiment data received together with the experiment notebook data with link information to the experiment notebook data and storing the experiment data in the experiment data database; and sixth means for recording history information such as type information indicating whether the experiment notebook data and experiment data stored in the experiment notebook database and the experiment data database is newly submitted, submitted after correction, or submitted after addition, and registrants, in the history management database, wherein the computer used by the approver further comprises:

seventh means for receiving a request for the detailed display of any one of the experiment notebook data in the list of unapproved experiment notebook data displayed on the display screen, sending a request for the acquisition of the experiment notebook data to the management computer, and displaying the experiment notebook data received from the management computer on the display screen; and eighth means for receiving comment data with respect to the displayed experiment notebook data from the input means, receiving a decision based on an "Approve" button or a "Reject" button and sending the entered comment data and decision information to the management computer, and wherein the management computer further comprises:

ninth means for searching the experiment notebook database for the experiment notebook data corresponding to the request for the acquisition of the experiment notebook data and sending back the data to the computer from which the request has been sent; and tenth means for associating the comment data and decision information received from the computer with the corresponding experiment notebook data, storing the data in the experiment notebook database, and updating the status of the experiment notebook data in the history management database in accordance with the decision information.

2. The system for managing the property of research and development according to claim 1, wherein the computer used by each experimenter further comprises eleventh means for: sending user authentication information of the experimenter using the computer to the management computer for receiving user authentication; receiving, upon successful user authentication, the history information including the submission history of the experiment notebook data of the experimenter and the approval history by the approver from the management computer; and displaying the information on the display screen, and wherein the management computer further comprises twelfth means for: receiving user authentication information from the computer used by the experimenter, identifying whether the experimenter is registered in a user information database, and sending back, when the experimenter is identified to be registered, the history information including submission history concerning the experiment notebook data and the experiment data submitted by the experimenter and approval history by the approver, to the computer used by the experimenter.

3. The system for managing the property of research and development according to claim 1, wherein the computer used by the approver further comprises thirteenth means for: sending user authentication information of the approver using the computer to the management computer for receiving user authentication; receiving, upon successful user authentication, a list of experiment notebook data not approved by the approver from the management computer; and displaying the list on the display screen, and wherein the management computer further comprises fourteenth means for receiving user authentication information from the computer used by the approver, identifying whether the approver is registered in a user information database, and when the approver is determined to be registered, searching the history management data base for the experiment notebook data not approved by the approver, and sending back a list of unapproved experiment notebook data, to the computer used by the approver.

4. The system for managing the property of research and development according to claim 2, wherein the computer used by each experimenter and approver further comprises fifteenth means for: receiving a search condition with respect to the experiment notebook data, experiment data, and history information, from an input means; sending the search request based on the search condition to the management computer; and displaying the search result received from the management computer on the display screen, and wherein the management computer further comprises sixteenth means for searching the experiment notebook database, the experiment data database, and history management database for the experiment notebook data and the experiment data corresponding to the search request and sending back the retrieved experiment notebook data, experiment data, and list of history information to the computer from which the search request has been sent.

5. The system for managing the property of research and development according to claim 4, wherein the computer used by each experimenter and approver further comprises seventeenth means for: receiving a request for a search for any one of the experiment notebook data, experiment data, and history information in the search result list displayed on the display screen from the input means; sending the search request to the management computer; and displaying the experiment notebook data, experiment data, and history information corresponding to the search request received from the management computer on the display screen, and wherein the management computer further comprises eighteenth means for: searching the experiment notebook database, experiment-data database, and history management database for the experiment notebook data, experiment data, and history information corresponding to the search request; and sending back the retrieved experiment notebook data, experiment data, and history information to the computer from which the search request has been sent.

6. The system for managing the property of research and development according to claim 2, wherein the computer used by each experimenter and approver further comprises nineteenth means for receiving a browse condition with respect to the experiment notebook data and experiment data from an input means; sending a browse request indicating the browse condition to the management computer; and displaying the result received from the management computer on a display screen, and wherein the management computer further comprises twentieth means for: searching the experiment notebook database, experiment-data database, and history management database for the experiment notebook data, experiment data, and history information corresponding to the browse request; and sending back the retrieved experiment notebook data, experiment data, and history information to the computer from which the browse request has been sent.

7. The system for managing the property of research and development according to claim 1, wherein the second means for the computer used by each experimenter refers to required description items previously set in a required description item table so as to check whether all the description data in the description items satisfying the required description requirements is entered.

8. The system for managing the property of research and development according to claim 1, wherein at least one of the control number of experiment apparatus, the usage time period, and the signature of the signature of the apparatus manager is set in the required description item table.

9. The system for managing the property of research and development according to claim 1, wherein the second means for the computer used by each experimenter receives biological information unique to the creator of experiment notebook data, adds the biological information to the experiment notebook data, and stores the experiment notebook data in the storage means.

* * * * *